United States Patent
Bird et al.

(10) Patent No.: US 6,675,095 B1
(45) Date of Patent: Jan. 6, 2004

(54) ON-BOARD APPARATUS FOR AVOIDING RESTRICTED AIR SPACE IN NON-OVERRIDING MODE

(75) Inventors: David Glenn Bird, Boulder, CO (US); James M. Janky, Los Altos, CA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 25 days.

(21) Appl. No.: 10/016,914

(22) Filed: Dec. 15, 2001

(51) Int. Cl.⁷ .............................. G06F 7/00; G06F 19/00
(52) U.S. Cl. ...................... 701/301; 701/1; 701/200; 342/29; 342/357.17; 340/436; 340/961
(58) Field of Search ................................. 701/4, 3, 7, 9, 701/11, 14, 211, 213, 200, 207, 208, 214, 301, 1; 342/29, 36, 357.13, 357.17, 357.03, 357.1; 340/436, 961; 345/3.1; 375/220, 130

(56) References Cited

U.S. PATENT DOCUMENTS

| | | | |
|---|---|---|---|
| 4,817,432 A | 4/1989 | Wallace et al. | 342/362 |
| 5,222,152 A | 6/1993 | Fishbine et al. | 327/283 |
| 5,229,764 A | 7/1993 | Matchett et al. | 382/115 |
| 5,230,025 A | 7/1993 | Fishbine et al. | 386/5.01 |
| 5,259,025 A | 11/1993 | Monroe et al. | 382/187 |
| 5,268,963 A | 12/1993 | Monroe et al. | 382/115 |
| 5,280,527 A | 1/1994 | Gullman et al. | 713/184 |
| 5,291,560 A | 3/1994 | Daugman | 713/186 |
| 5,335,288 A | 8/1994 | Faulkner | 705/75 |
| 5,363,453 A | 11/1994 | Gagne et al. | 327/365 |
| 5,465,142 A | 11/1995 | Krumes et al. | 382/177 |
| 5,483,601 A | 1/1996 | Faulkner et al. | 73/602 |
| 5,872,540 A | 2/1999 | Casabona | 384/115 |
| 5,883,586 A * | 3/1999 | Tran et al. | 340/945 |
| 5,886,666 A * | 3/1999 | Schellenberg et al. | 701/3 |
| 5,936,552 A * | 8/1999 | Wichgers et al. | 340/963 |
| 6,021,156 A | 2/2000 | Wagner | 382/117 |
| 6,058,135 A | 5/2000 | Spliker | 713/184 |
| 6,112,141 A * | 8/2000 | Briffe et al. | 701/14 |
| 6,133,867 A * | 10/2000 | Eberwine et al. | 342/29 |
| 6,151,497 A * | 11/2000 | Yee et al. | 455/430 |
| 6,161,063 A | 12/2000 | Deker | 705/75 |
| 6,185,430 B1 * | 2/2001 | Yee et al. | 455/519 |
| 6,219,376 B1 | 4/2001 | Zhodzishsky | 382/117 |
| 6,225,890 B1 | 5/2001 | Murphy | 713/184 |
| 6,239,743 B1 | 5/2001 | Lennen | 705/75 |
| 6,385,513 B1 * | 5/2002 | Murray et al. | 701/14 |
| 6,408,180 B1 * | 6/2002 | McKenna et al. | 455/431 |
| 6,411,806 B1 * | 6/2002 | Garner et al. | 455/428 |
| 2002/0133294 A1 * | 9/2002 | Farmakis et al. | 701/301 |

* cited by examiner

Primary Examiner—Thomas G. Black
Assistant Examiner—Ronnie Mancho
(74) Attorney, Agent, or Firm—Boris G. Tankhilevich

(57) ABSTRACT

A tamper-resistant apparatus located on board of an aircraft for avoiding a restricted air space (RAS) comprising: (a) a tamper-resistant restricted air space (TAP-RAS) database configured to include a set of coordinates that determines the RAS; and (b) a navigational processor configured to navigate the aircraft around the RAS, if a valid overriding command is not generated. The navigational processor includes: a Satellite Positioning System (SATPS) configured to substantially continuously obtain a set of real time position coordinates of the aircraft; a restricted airspace controller configured to receive a set of real time data including the set of coordinates that determines the RAS, the set of real time position coordinates; and configured to analyze the set of real time data in order to substantially continuously generate a set of real time commands; and an aircraft controller configured to navigate the aircraft utilizing the real time set of commands around the RAS. The navigational processor is configured to navigate the aircraft in an overriding mode, if the valid overriding command is generated.

14 Claims, 7 Drawing Sheets

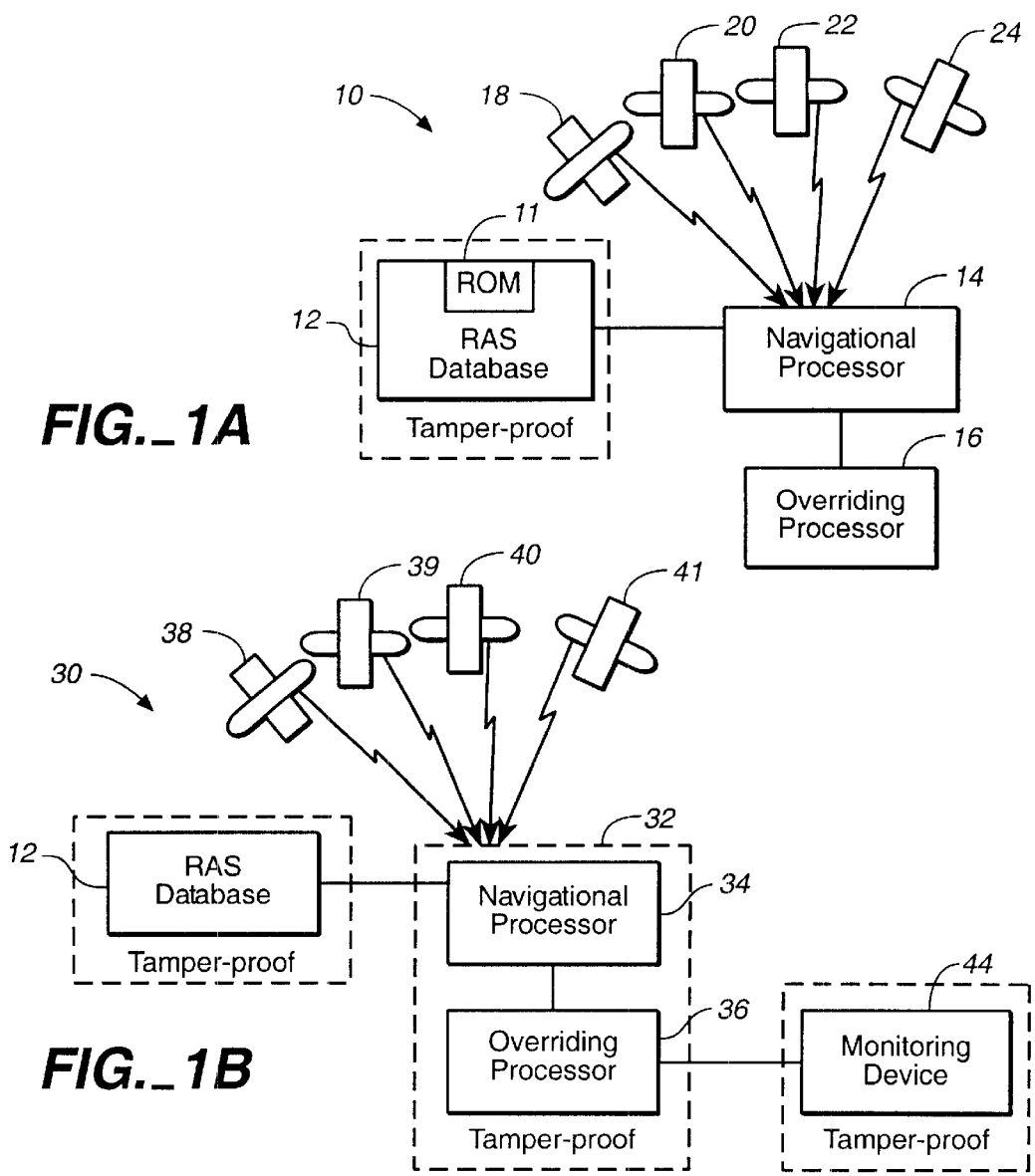
FIG._1A
FIG._1B
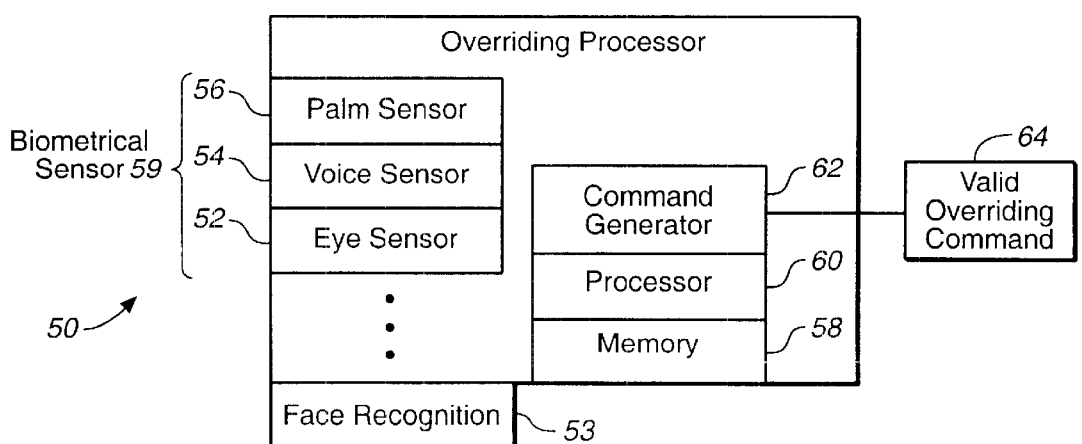
FIG._1C

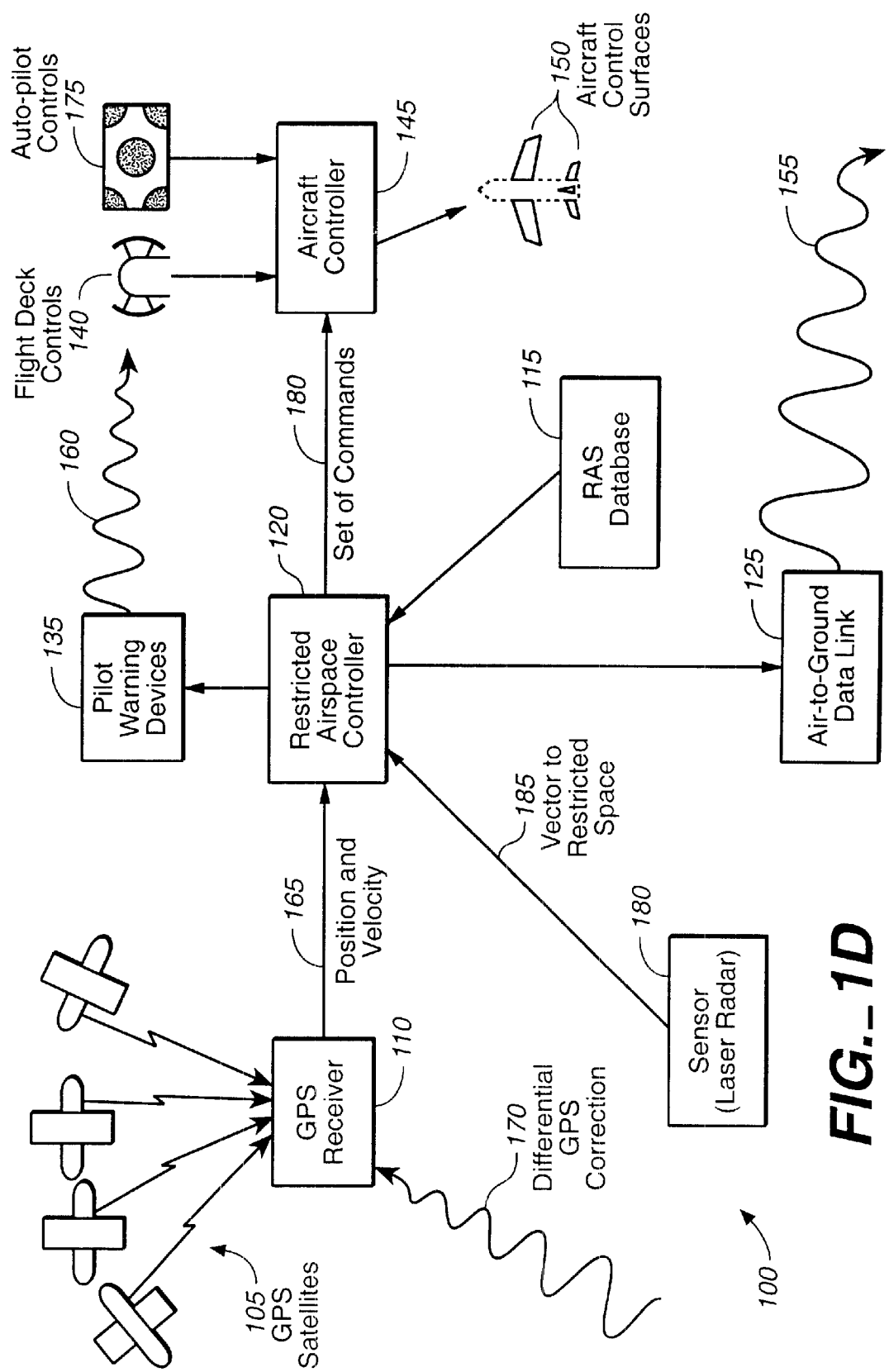
FIG._1D

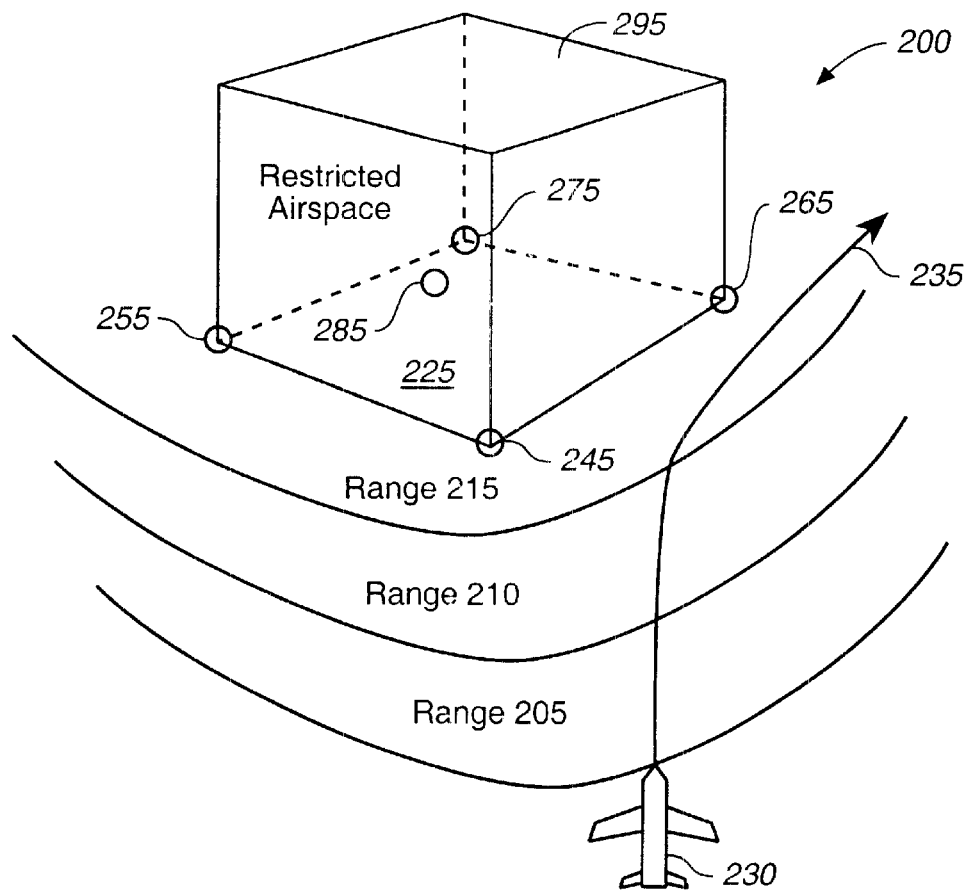
FIG._2
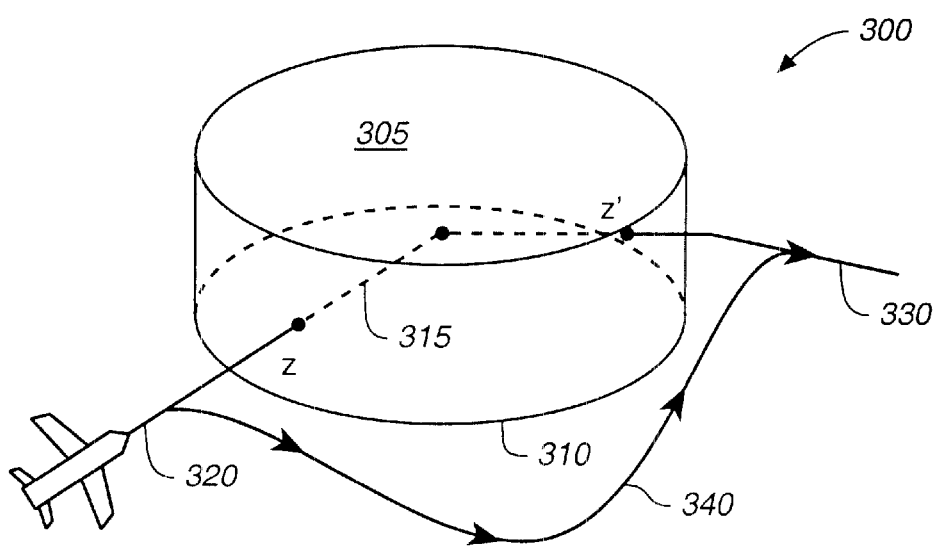
FIG._3

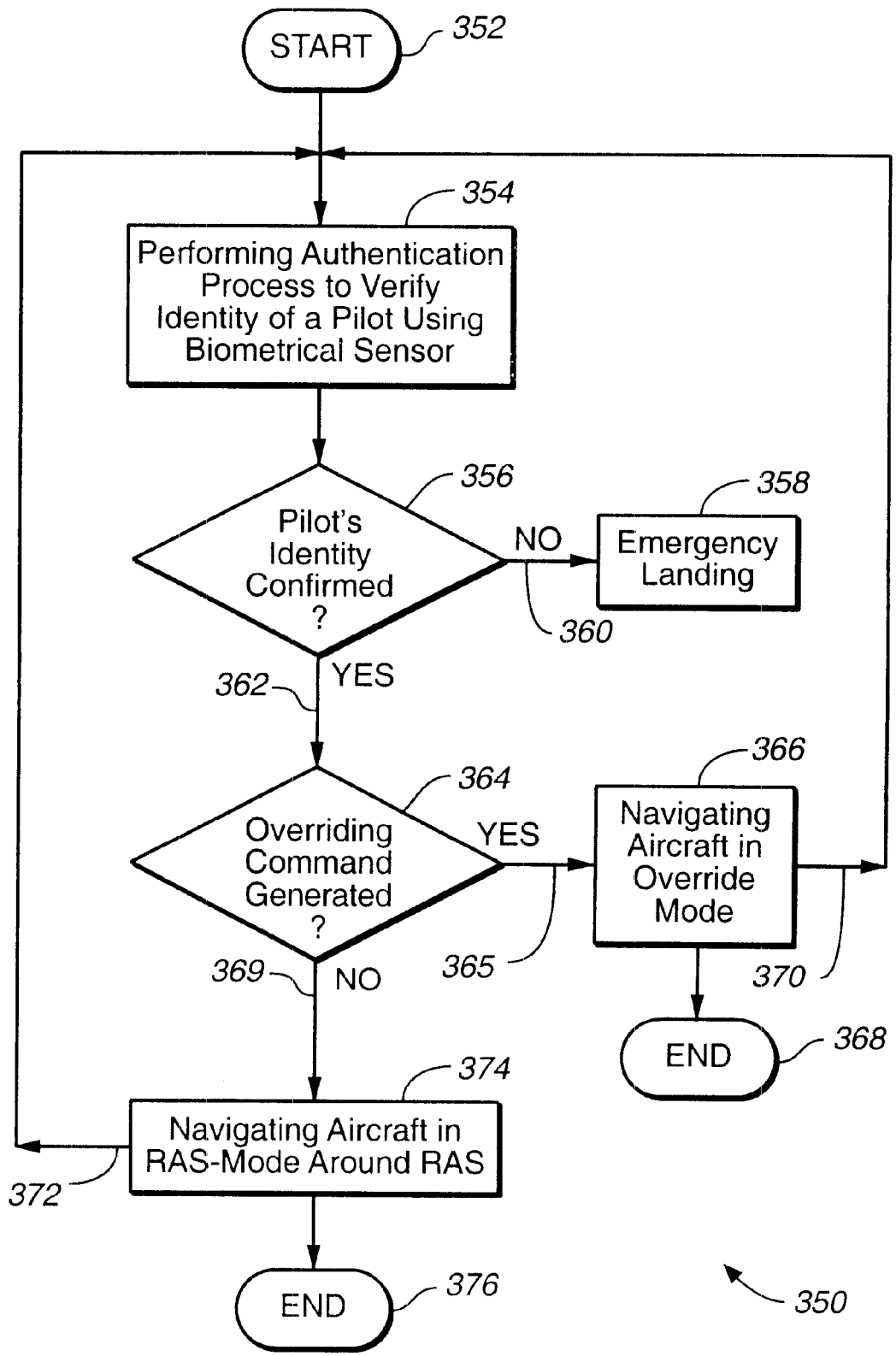
FIG._4A

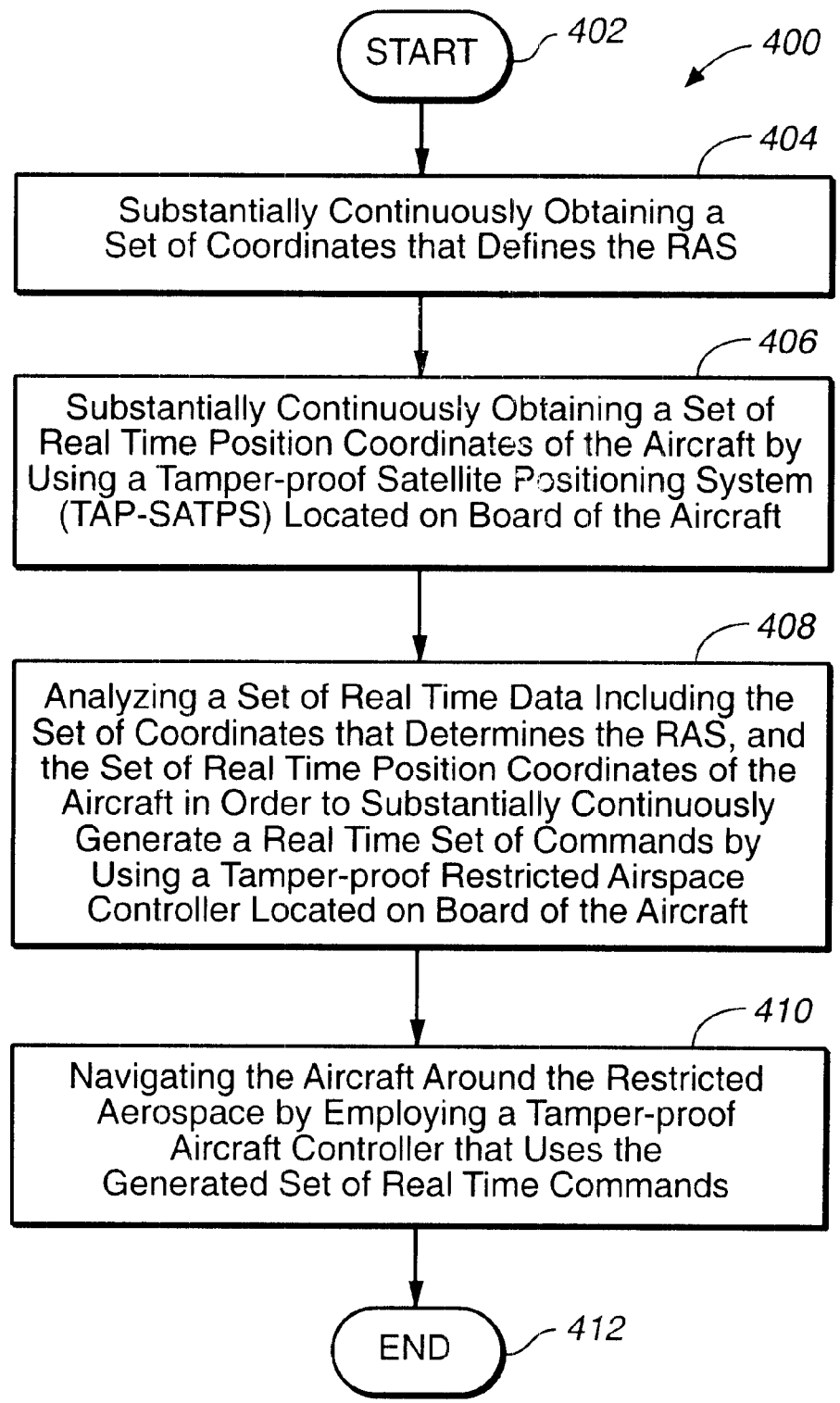
FIG._4B

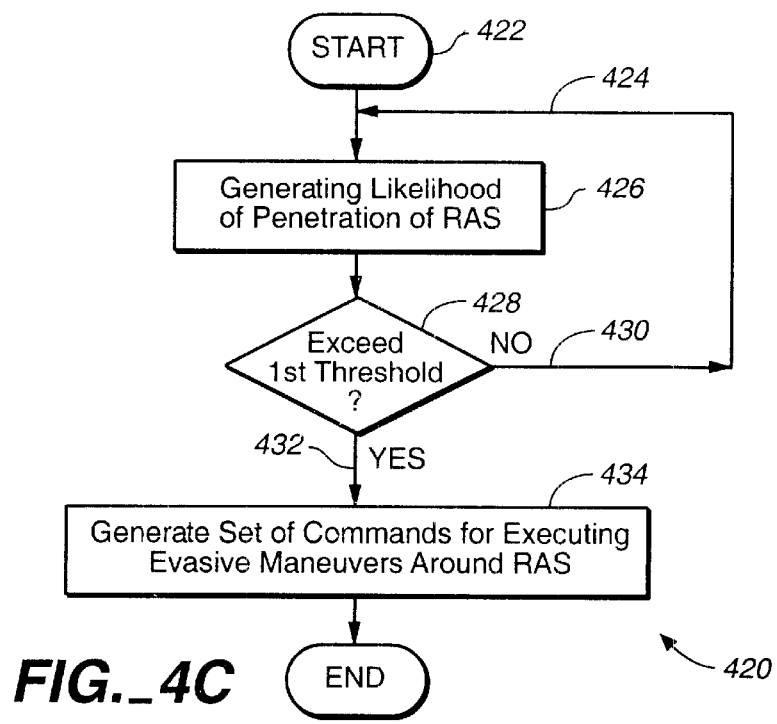
FIG._4C
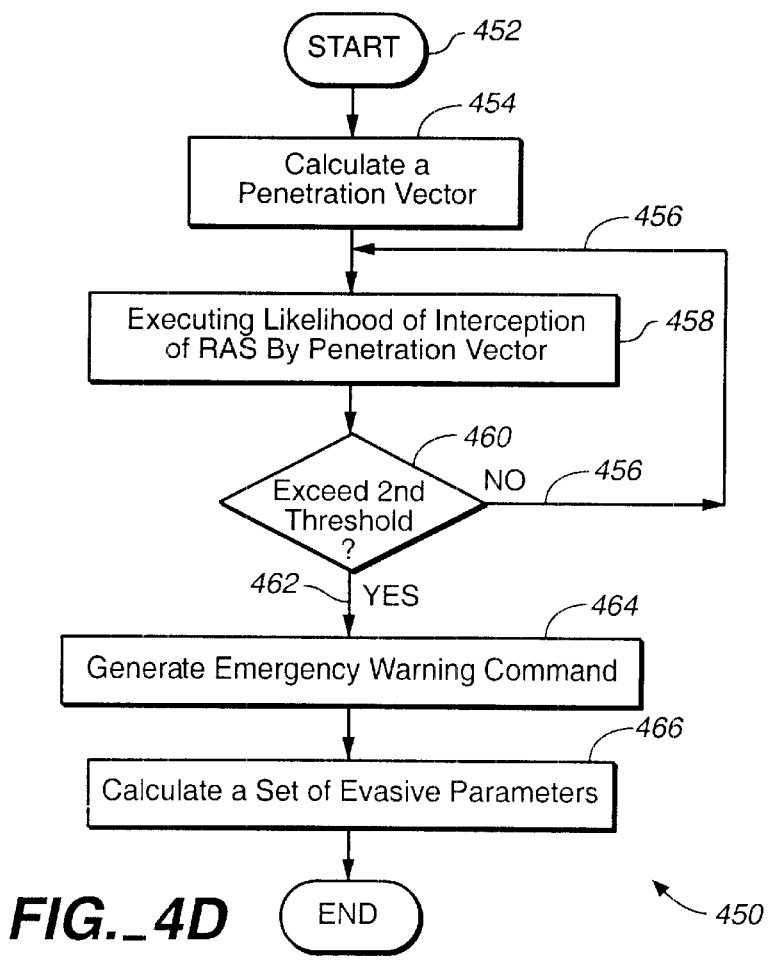
FIG._4D

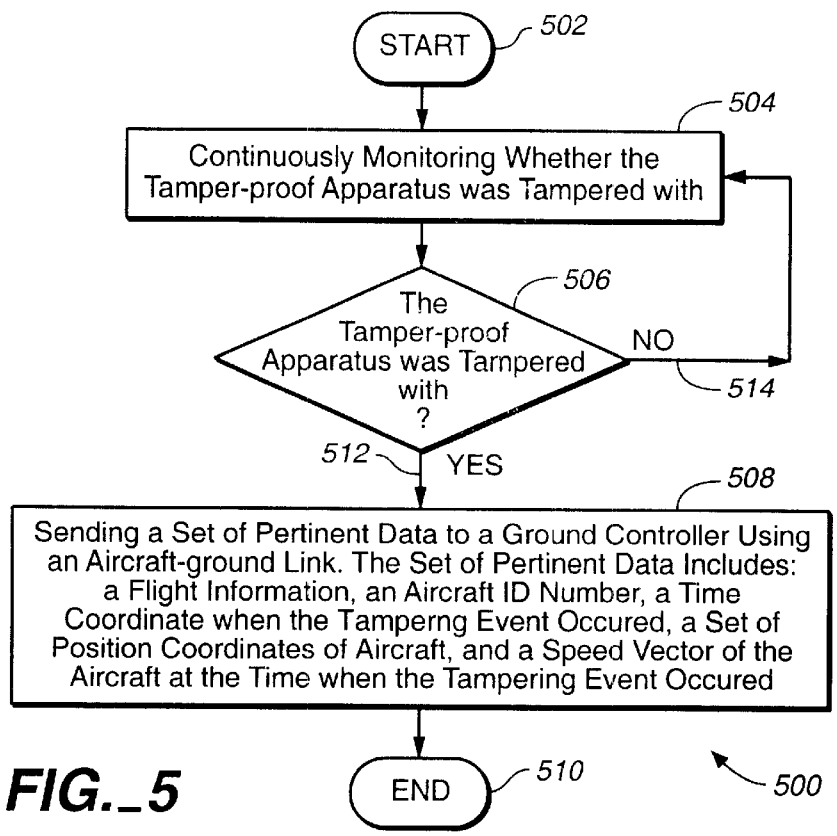
FIG._5
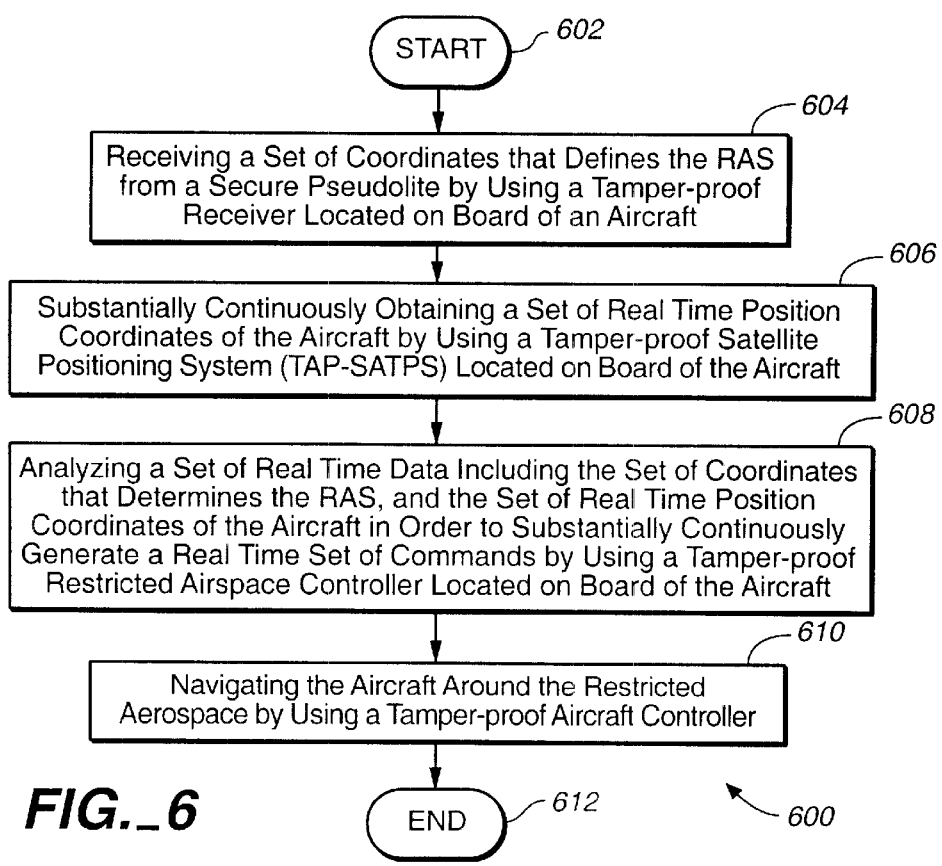
FIG._6

ON-BOARD APPARATUS FOR AVOIDING RESTRICTED AIR SPACE IN NON-OVERRIDING MODE

BACKGROUND OF THE INVENTION

1. Field of the Invention

The present invention relates to a field of collision avoidance systems, and more specifically, to a field of navigating an aircraft around a restricted air space (RAS).

2. Discussion of the Prior Art

Many commercial aircraft systems include avionics systems that prevent the pilot from instructing the plane to do maneuvers that are outside of its design envelope. For instance, Krumes et al in the U. S. Pat. No. 5,465,142, discloses "a system for sensing objects in the flight path of an aircraft and alerting the pilot to their presence including a laser radar subsystem for emitting a beam of laser energy, receiving returns from objects, and processing the returns to produce range data related to the range of the objects from the aircraft. A scanning subsystem scans the beam and produces directional information related to the instantaneous direction of the beam relative to the aircraft. Processor circuitry controls operation, processes the range data and directional information with instrumentation data from the avionics system, produces video information related to the range, direction, and type of the objects, and interfaces the video information to the video display system. The processor circuitry may be programmed to (1) overlay video information on existing aircraft video display system, (2) provide acoustical warnings on an aircraft intercom, (3) analyze returns by subdividing the field of regard into a series of analysis windows, performing a statistical analysis of the returns related to each of the analysis windows, and identifying returns that fall into a common range interval, (4) transforming coordinates of objects measured relative to the aircraft to a horizon-stabilized, north-oriented coordinate system which is independent of the attitude of the aircraft, (5) inserting the coordinates of identified objects into a data base so that the coordinates may be used for constructing a video display at a later time and updating the data base to correct for movements of the aircraft, and (6) constructing a window-of-safety display of objects currently within the field of regard by adjusting the displayed position of the objects to compensate for avoidance maneuvers the pilot may execute." In addition, the U. S. Pat. No. 6,161,063, issued to Deker, describes "a method of automatically controlling an aircraft to avoid a vertical zone including several steps. The aircraft first acquires limits of the zone to be avoided. The zone is modeled by a cylindrical volume which is limited by a horizontal contour with upper and lower altitudes of the zone. The cylindrical volume associated with a scheduled route of the aircraft is located and points of entry and exit in the cylindrical volume are determined. A new flight altitude is calculated in order to avoid the zone. A point of change of altitude is calculated to reach an avoidance altitude. The new flight altitude is updated and the point of change of altitude is input into an automatic pilot."

However, it is become useful for an aircraft to have an on-board navigational system that would prevent the aircraft from entering a predetermined restricted airspace (RAS) in the event that the pilot could not take an appropriate evasive action on his own, for whatever reason. For example, a restricted airspace (RAS) can include a mile horizontal, and a thousand feet vertical of previously-defined spaces. The properly designed on-board navigation-control system should also limit the velocity and acceleration vectors of an aircraft when the aircraft is within a prescribed range to the RAS.

It is become also very useful to have an on-board tamper-proof or tamper-resistant navigational system that would prevent the pilot from entering a predetermined RAS, and that is very difficult to tamper with, or circumvent. However, a pilot with a valid identity authentication should be able to override the on-board tamper-proof or tamper-resistant navigational system in certain emergency cases. Thus, the on-board tamper-proof navigational system should be able to operate in at least two modes: (a) non-overriding mode, when the pilot can not override the on-board tamper-proof/tamper-resistant navigational system that would prevent the pilot from entering a predetermined RAS; (b) overriding mode, when the pilot upon proper authentication of his identity, is able to override the on-board tamper-proof/tamper-resistant navigational system and take control of the aircraft despite there being a possibility of entering a restricted airspace, presumably with the goal of flying around it himself instead of letting the navigational system fly the plane.

SUMMARY OF THE INVENTION

To address the shortcomings of the available art, the present invention provides a tamper-proof/tamper-resistant apparatus located on board of an aircraft for avoiding a restricted air space (RAS). Tamper-proof and tamper-resistant are used interchangeably as the term might apply to each component in the system. Some components may be truly tamper-proof, while others can only achieve tamper-resistance. That is, the component cannot ever be made truly tamper-proof.

In one embodiment of the present invention, a tamper-proof apparatus located on board of an aircraft for avoiding a restricted air space (RAS) comprises: (1) a tamper-proof restricted air space (TAP-RAS) database configured to include a set of coordinates that determines the RAS; and (2) a navigational processor configured to navigate the aircraft around the RAS, if a valid overriding command is not generated. If a valid overriding command is generated, the navigational processor is configured to navigate the aircraft in an overriding mode. In one embodiment when the valid overriding command is implemented, the navigational processor can continue to fly the plane to avoid the RAS; the pilot can make minor adjustments as he sees fit, or can take over control entirely, at his discretion. Alternatively, while being in the overriding mode, the navigational processor can be configured to navigate the aircraft in such a way as to penetrate the RAS. This event cannot be avoided if a valid overriding authorization is entered by an authentic and approved pilot.

In one embodiment of the present invention, the navigational processor further comprises: (a) a Satellite Positioning System (SATPS) configured to substantially continuously obtain a set of real time position coordinates of the aircraft; (b) a restricted airspace controller configured to receive and analyze a set of real time data including the set of coordinates that determines the RAS and the set of real time position coordinates in order to substantially continuously generate a real time set of commands; and (c) an aircraft controller configured to navigate the aircraft utilizing the real time set of commands around the RAS.

In one embodiment, the restricted airspace controller is configured to receive and analyze a set of real time data including the set of coordinates that determines the RAS and the set of real time position coordinates in order to substantially continuously generate the likelihood of penetration of the RAS based on the current flight path, RAS position, and the current speed and acceleration of the aircraft. In this embodiment, the restricted airspace controller generates a set of real time commands for executing evasive maneuvers to avoid the RAS, and an estimate of the flight time until such execution should begin.

The Satellite Positioning System (SATPS) further includes: a Global Positioning System (GPS), a Global Navigational System (GLONASS), or a combined GPS/GLONASS system.

In one embodiment, the Global Positioning System (GPS) further includes a differential Global Positioning System (DGPS) configured to receive a set of differential corrections in order to substantially continuously obtain a set of real time position coordinates of the aircraft with increased accuracy. In one embodiment, the differential Global Positioning System (DGPS) further includes a velocity block configured to substantially continuously obtain a set of real time velocity vectors of the aircraft, and an acceleration block configured to substantially continuously obtain a set of real time acceleration vectors of the aircraft.

In one embodiment, the restricted airspace controller further includes a message block configured to substantially continuously generate a set of real time messages; wherein a pilot warning device is configured to receive this set of real time warning messages, and configured to present this set of warning messages in audio and/or visual format.

In one embodiment, the navigational processor located on board of an aircraft is configured to substantially continuously receive a set of real time signals including the position coordinates of the RAS from at least one anti-spoof and anti-jam pseudolite located in the RAS. In this embodiment, the anti-spoof and anti-jam pseudolite is configured to substantially continuously transmit a set of real time pseudolite signals including the position coordinates of the pseudolite itself and a buffer range data set defining around the RAS to the navigational processor located on board of an aircraft.

In one embodiment of the present invention, the anti-spoof and anti-jam pseudolite located in the RAS includes a split-spectrum pseudolite that is configured to substantially continuously transmit a set of real time split-spectrum pseudolite signals including the position coordinates of the pseudolite and a buffer range data set defining around the RAS. The set of split-spectrum signals is configured to minimize interference with the reception of satellite signals by the satellite receiver located on board of the aircraft.

In one tamper-proof embodiment of the present invention, the navigational processor comprises a tamper-proof navigational processor. In this embodiment of the present invention, the tamper-proof navigational processor further includes: (a) a tamper-proof/tamper resistant Satellite Positioning System (TAP-SATPS) configured to substantially continuously obtain a set of real time position coordinates of the aircraft; (b) a tamper-proof restricted airspace controller configured to receive a set of real time data including the set of coordinates that determines the restricted air space, the set of real time position coordinates; and configured to analyze the set of real time data in order to substantially continuously generate a real time set of commands; and (c) a tamper-proof aircraft controller configured to receive the real time set of commands and configured to navigate the aircraft utilizing the real time set of commands around the RAS.

In one embodiment, the tamper-proof restricted airspace controller is configured to calculate a vector from based on the current flight path of the aircraft and determines if that vector intercepts the RAS at any point of the surface of the RAS; if such a penetration of the RAS surface, as defined by the RAS database, occurs, an emergency warning is issued to the cockpit both audibly and/or visually to warn the pilot. In another embodiment, the tamper-proof restricted airspace controller is configured to determine the amount of time necessary to make evasive maneuvers, and the point in space and time whereby these maneuvers should begin in order to avoid penetrating the RAS, and is configured to calculate the time remaining before such maneuvers should begin.

The tamper-proof/tamper-resistant Satellite Positioning System (TAP-SATPS) can further include: a tamper-proof/tamper-resistant Global Positioning System (TAP-GPS), a tamper-proof/tamper-resistant Global Navigational System (TAP-GLONASS), or a tamper-proof/tamper-resistant combined GPS/GLONASS system (TAP-GPS/GLONASS).

In one embodiment, the tamper-proof Global Positioning System (TAP-GPS) further includes a differential tamper-proof Global Positioning System (DIF-TAP-GPS) configured to receive a set of differential corrections in order to substantially continuously obtain a set of real time position coordinates of the aircraft with increased accuracy. In one embodiment, the differential tamper-proof Global Positioning System (DIF-TAP-GPS) further includes a velocity block configured to substantially continuously obtain a set of real time velocity vectors of the aircraft, and an acceleration block configured to substantially continuously obtain a set of real time acceleration vectors of the aircraft.

In one embodiment, the tamper-proof restricted airspace controller further includes a message block configured to substantially continuously generate a set of real time messages; wherein a pilot warning device is configured to receive this set of real time warning messages, and configured to present this set of warning messages in audio and/or visual format.

In one embodiment, a tamper-proof satellite receiver located on board of an aircraft is configured to substantially continuously receive a set of real time signals including the position coordinates of the RAS in order to navigate the aircraft around the RAS. In one embodiment, the tamper-proof satellite receiver located on board of an aircraft receives the position coordinates from at least one anti-spoof and anti-jam pseudolite located in the RAS that is configured to substantially continuously transmit a set of real time pseudolite signals including its own position coordinates and the position coordinates of a buffer range data set further defining around the RAS.

In one embodiment, the anti-spoof and anti-jam pseudolite located in the RAS includes a split-spectrum pseudolite that is configured to substantially continuously transmit a set of real time split-spectrum pseudolite signals including the position coordinates of the pseudolite and a buffer range around the RAS. The set of split-spectrum signals is configured to minimize interference with the reception of satellite signals by the tamper-proof/tamper-resistant satellite positioning receiver located on board of the aircraft.

In one embodiment of the present invention, the on-board apparatus further includes an overriding processor configured to generate a valid overriding command. In one embodiment, the overriding processor further includes a biometric authentication sensor configured to validate the overriding command upon verifying the authenticity of an overriding person with the authority to initiate an over-ride command, for instance an authenticity of a pilot whose identity and biometric indicia are stored in the overriding processor or the biometric authentication sensor, that issues the overriding command. In one embodiment of the present invention, the biometric authentication sensor is a sensor selected from the group consisting of an eye retina authentication sensor, a voice authentication sensor, a palm authentication sensor, and a face recognition sensor.

Another aspect of the present invention is directed to a method for navigating an aircraft around a restricted air space (RAS). In one embodiment, the method for navigating an aircraft comprises the following steps: (1) navigating the aircraft around a restricted air space (RAS) in a restricted air space mode (RAS-mode); if a valid overriding command is not generated; and (2) navigating the aircraft in an overriding mode (RAS-override-mode); if the valid overriding command is generated.

In one embodiment of the present invention, the step of navigating the aircraft around the RAS in the RAS-mode further includes the following steps: (1) substantially continuously obtaining a set of coordinates that defines the RAS; (2) substantially continuously obtaining a set of real time position coordinates of the aircraft; and (3) analyzing a set of real time data including the set of coordinates that determines the RAS, and the set of real time position coordinates of the aircraft in order to substantially continuously generate a real time set of commands for navigating the aircraft away from or around the RAS.

In one embodiment of the present invention, the step of navigating the aircraft around the RAS in the RAS-mode further includes the steps of: (a) continuously monitoring whether the tamper-proof on-board apparatus was tampered with; and (b) if the tamper-proof apparatus on-board was tampered with, sending a set of monitoring data to a ground controller using an aircraft-ground link. In one embodiment of the present invention, the set of monitoring data is selected from the group consisting of: a flight information, an aircraft ID number, a time coordinate when the tampering event occurred, a set of position coordinates of the aircraft at the time coordinate when the tampering event occurred, and a speed vector of the aircraft at the time coordinate when the tampering event occurred.

In one embodiment of the present invention, when the valid overriding command is generated, the step of navigating the aircraft in such overriding mode (RAS-override-mode) further includes the steps of: verifying an authenticity of the pilot identity; and generating the valid overriding command by using an overriding processor, if the authenticity of the pilot identity is established.

BRIEF DESCRIPTION OF DRAWINGS

The aforementioned advantages of the present invention as well as additional advantages thereof will be more clearly understood hereinafter as a result of a detailed description of a one embodiment of the invention when taken in conjunction with the following drawings.

FIG. 1A depicts an on-board apparatus of the present invention for avoiding a restricted air space (RAS) comprising a tamper-proof RAS database, a navigational processor, and an overriding processor.

FIG. 1B illustrates an on-board apparatus of the present invention for avoiding a restricted air space (RAS) comprising a tamper-proof RAS database, a tamper-proof navigational processor, and a tamper-proof overriding processor.

FIG. 1C depicts an overriding processor in more details.

FIG. 1D shows a navigational processor in more details.

FIG. 2 illustrates a restricted airspace (RAS) modeled by a cube and a number of warning ranges.

FIG. 3 shows a restricted airspace (RAS) modeled by using a cylindrical volume which is limited by a horizontal contour with upper and lower altitudes of the zone.

FIG. 4A depicts a flow chart of a method for navigating an aircraft around a RAS in a restricted air space mode (RAS-mode), and in an overriding mode (RAS-override-mode).

FIG. 4B is a flow chart of a method of the present invention for navigating an aircraft around a RAS in the restricted air space mode (RAS-mode).

FIG. 4C shows a flow chart of a step of analyzing the set of real time data in order to determine whether the likelihood of RAS penetration exceeds the first predetermined threshold.

FIG. 4d depicts a flow chart of a step of generating a set of commands for executing evasive maneuvers undertaken to avoid the penetration of the RAS.

FIG. 5 illustrates a flow chart of the method of the present invention to determine whether the tamper-proof/tamper-resistant apparatus of FIG. 1 was tampered with.

FIG. 6 is a flow chart of a method for navigating an aircraft around a RAS wherein the RAS data is received using a secure pseudolite located in the RAS.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1A depicts an on-board apparatus 10 of the present invention for avoiding a restricted air space (RAS) comprising a restricted airspace (RAS) database 12, a navigational processor 14, and an overriding processor 16.

In one embodiment, the restricted airspace (RAS) database 12 needs to be protected from alteration at any time after its creation by an authorized source. In one embodiment of the present invention, RAS database 12 includes a permanent memory, such as a Read-Only Memory, or ROM 11, to store the database. Deletions or alterations to this database can also be prevented, or at least made much more difficult, by the addition of password authentication requirements for accessing the operating system or the program that runs the access to this database.

Such password authentication methods are well known in the arts, and are embodied in encryption systems such as the DES, or Data Encryption Standard, published by the U. S. Government in the Processing Standards Publication 46-2, on Dec. 30, 1993. The Data Encryption Standard (DES)

specifies a complete description of a mathematical algorithm for encrypting (enciphering) and decrypting (deciphering) binary coded information. Encrypting data converts it to an unintelligible form called cipher. Decrypting cipher converts the data back to its original form called plaintext. The algorithm described in this standard specifies both enciphering and deciphering operations which are based on a binary number called a key. A key consists of 64 binary digits ("0"s or "1"s) of which 56 bits are randomly generated and used directly by the algorithm. The other 8 bits, which are not used by the algorithm, are used for error detection. The 8 error detecting bits are set to make the parity of each 8-bit byte of the key odd, i.e., there is an odd number of "1"s in each 8-bit byte. Authorized users of encrypted computer data should have the key that was used to encipher the data in order to decrypt it. The encryption algorithm specified in this standard is commonly known among those using the standard. The unique key chosen for use in a particular application makes the results of encrypting data using the algorithm unique. Selection of a different key causes the cipher that is produced for any given set of inputs to be different. The cryptographic security of the data depends on the security provided for the key used to encipher and decipher the data. Data can be recovered from cipher only by using exactly the same key used to encipher it. Unauthorized recipients of the cipher who know the algorithm but do not have the correct key cannot derive the original data algorithmically. However, anyone who does have the key and the algorithm can easily decipher the cipher and obtain the original data. A standard algorithm based on a secure key thus provides a basis for exchanging encrypted computer data by issuing the key used to encipher it to those authorized to have the data. Data that is considered sensitive by the responsible authority, data that has a high value, or data that represents a high value should be cryptographically protected if it is vulnerable to unauthorized disclosure or undetected modification during transmission or while in storage.

The other encryption program that is well known is the PGP product (for instance, PGP® Mobile) that enables individuals and mobile personnel to protect their most confidential information, including the passwords. PGP products, including PGP® Mobile, are manufactured by the PGP Corporation located in 3460 West Bayshore, Palo Alto, Calif. 94303, USA. PGP combines some of the best features of both conventional and public key cryptography. PGP is a hybrid cryptosystem. When a user encrypts plaintext with PGP, PGP first compresses the plaintext. Data compression saves modem transmission time and disk space and, more importantly, strengthens cryptographic security. Most cryptanalysis techniques exploit patterns found in the plaintext to crack the cipher. Compression reduces these patterns in the plaintext, thereby greatly enhancing resistance to cryptanalysis. (Files that are too short to compress or which don't compress well aren't compressed.) PGP then creates a session key, which is a one-time-only secret key. This key is a random number generated from the random movements of your mouse and the keystrokes you type. This session key works with a very secure, fast conventional encryption algorithm to encrypt the plaintext; the result is ciphertext. Once the data is encrypted, the session key is then encrypted to the recipient's public key. This public key-encrypted session key is transmitted along with the ciphertext to the recipient. Decryption works in the reverse. The recipient's copy of PGP uses his or her private key to recover the temporary session key, which PGP then uses to decrypt the conventionally-encrypted ciphertext. The combination of the two encryption methods combines the convenience of public key encryption with the speed of conventional encryption. Conventional encryption is about 1,000 times faster than public key encryption. Public key encryption in turn provides a solution to key distribution and data transmission issues. Used together, performance and key distribution are improved without any sacrifice in security.

The other requirement to make the RAS database 12 of FIG. 1 tamper-proof is that the ROM 11 should not be removable while in flight. In one embodiment, the location of the ROM needs to be secured mechanically, so that ROM itself is not removable while in flight. For instance, (a) ROM is itself securely locked; (b) ROM is installed in locations which require special tools to open; (c) ROM is located in places not accessible while in flight.

In one embodiment of the present invention, as disclosed below, the ROM 11 is not employed to store RAS database. In this embodiment, ROM 11 can be still employed to store different decryption and encryption means, like passwords, keys, etc, in order to prevent tampering with these decryption and encryption means by an unauthorized personal.

Referring still to FIG. 1A, the on-board apparatus 10 of the present invention for avoiding a restricted air space (RAS) further includes a navigational processor 14, and an overriding processor 16. The navigational processor 14 is configured to navigate the aircraft around the RAS, if a valid overriding command is not generated by the overriding processor 16. If a valid overriding command is generated by the overriding processor 16, the navigational processor 14 is configured to navigate the aircraft in an overriding mode. For instance, in the overriding mode, the navigational processor can be configured to navigate the aircraft in such a way as to penetrate the RAS, or to continue with evasive maneuvers to avoid the RAS.

FIG. 1B illustrates an on-board apparatus 30 of the present invention for avoiding a restricted air space (RAS) comprising a tamper-proof RAS database 12, a tamper-proof navigational processor 34, and a tamper-proof overriding processor 36. In one embodiment of the present invention, the tamper-proof apparatus 30 also includes a monitoring device 44 that allows one to monitor the tamper-proof condition of the apparatus 30. In one embodiment of the present invention, the monitoring device 44 includes an air-to-ground control data link 125 (of FIG. 1D) to a ground control station (not shown). In one embodiment, the ground control station includes a Flight Service Station, or FSS. Please, see the full discussion below.

Referring still to FIG. 1A, in one embodiment of the present invention, the apparatus 10 includes a tamper-proof restricted air space (TAP-RAS) database 12 configured to include a set of coordinates that determines the restricted air space (RAS). In one example of an RAS, the RAS includes a square mile horizontally and a thousand feet vertically of previously-defined spaces.

FIG. 2 illustrates a restricted airspace RAS modeled as a cube 225, and a number of warning ranges 215, 210, and 205. In one embodiment of the present invention, when the properly measured distance (for example, by the laser radar 180 of FIG. 1D, please, see discussion below) between an approaching aircraft 230 and the RAS 225 is equal or less than one of the warning ranges 205, 210, or 215, an appropriate warning signal to a pilot, to a ground controller, or a signal to take an evasive action is generated by a pilot warning device (135 of FIG. 1D; please, see the full discussion below). An aircraft controller 145 (of FIG. 1D) navigates the aircraft utilizing the real time set of commands

180 around the RAS and executes an avoiding maneuver (please, see the full discussion below).

The RAS for the purposes of the present invention includes an airspace area that is designated as a restricted area by Federal Aviation Administration (FAA). In one embodiment of the present invention, RAS includes an airport advisory area.

According to FAA publication, "Aeronautical Information Manual" (AIM), Traffic Advisory Practices at Airports Without Operating Control Towers, Section 5. Paragraph 4-1-9, the airport advisory area is an area within 10 statute miles of an airport where a control tower is not operating but where a Flight Service Station, or FSS, is located. At such locations, the FSS provides advisory service to arriving and departing aircraft. It is not mandatory that pilots participate in the Local Airport Advisory program, but it is strongly recommended that they do.

In one embodiment of the present invention, RAS includes a temporary flight restriction area. The purposes of establishing of such an area is: (a) to protect persons and property in the air or on the surface from an existing or imminent hazard associated with an incident on the surface when the presence of low flying aircraft would magnify, alter, spread, or compound that hazard (14 CFR Section 91.137(a)(1)); (b) to provide a safe environment for the operation of disaster relief aircraft (14 CFR Section 91.137 (a)(2)); or (c) to prevent an unsafe congestion of sightseeing aircraft above an incident or event which may generate a high degree of public interest (14 CFR Section 91.137(a) (3)).

In one embodiment of the present invention, the RAS includes an airspace area designated by FAA to protect the President, Vice President, or other public figures (14 CFR Section 91.141).

In one embodiment of the present invention, the RAS includes an airspace area designated by FAA to provide a safe environment for space agency operations (14 CFR Section 91.143). A temporary flight restrictions area, except the highjacking situation, will be established by or through the area manager at the Air Route Traffic Control Center (ARTCC) having jurisdiction over the area concerned. A temporary flight restrictions can be issued according to NOTAM, or NOTICE TO AIRMEN SYSTEM. A typical NOTAM notice includes an essential flight operation information not known sufficiently in advance to publicize by other means. Types of NOTAM's include the following: (a) NOTAM "D"—information that requires wide dissemination and pertains to en route navigational aids, civil public use landing areas listed in the Airports Facility Directory and aeronautical data related to Instrument Flight Rule (IFR) operations; (b) NOTAM "L"—information that requires local dissemination, but does not qualify as NOTAM(D) information (for instance, aircraft jettisoning fuel, bird activity, moored balloons, military training activity, etc.); (c) Flight Data Center (FDC)—information that is regulatory in nature pertaining to flight including, but not limited to, changes to charts, procedures and airspace usage. NOTAM involving the conditions of 14 CFR Section 91.137(a)(3) will be issued at the direction of the regional air traffic division manager having oversight of the airspace concerned.

The FAA accepts recommendations for the establishment of a temporary flight restrictions area under 14 CFR Section 91.137(a)(1) from military major command headquarters, regional directors of the Office of Emergency Planning, Civil Defense State Directors, State Governors, or other similar authority. For the situations involving 14 CFR Section 91.137(a)(2), the FAA accepts recommendations from military commanders serving as regional, subregional, or Search and Rescue (SAR) coordinators; by military commanders directing or coordinating air operations associated with disaster relief; or by civil authorities directing or coordinating organized relief air operations (includes representatives of the Office of Emergency Planning, U.S. Forest Service, and State aeronautical agencies). Appropriate authorities for a temporary flight restrictions establishment under 14 CFR Section 91.137(a)(3) are any of those listed above or by State, county, or city government entities.

The type of restrictions issued will be kept to a minimum by the FAA consistent with achievement of the necessary objective. Situations which warrant the extreme restrictions of 14 CFR Section 91.137(a)(1) include, but are not limited to: toxic gas leaks or spills, flammable agents, or fumes which if fanned by rotor or propeller wash could endanger persons or property on the surface, or if entered by an aircraft could endanger persons or property in the air; imminent volcano eruptions which could endanger airborne aircraft and occupants; nuclear accident or incident; and highjackings. Situations which warrant the restrictions associated with 14 CFR Section 91.137(a)(2) include: forest fires which are being fought by releasing fire retardants from aircraft; and aircraft relief activities following a disaster (earthquake, tidal wave, flood, etc.). 14 CFR Section 91.137 (a)(3) restrictions are established for events and incidents that would attract an unsafe congestion of sightseeing aircraft.

When hijacking situations are involved, a temporary flight restrictions area will be implemented through the FAA Washington Headquarters Office of Civil Aviation Security. The appropriate FAA air traffic element, upon receipt of such a request, will establish a temporary flight restrictions area under 14 CFR Section 91.137(a)(1).

The amount of airspace needed to protect persons and property or provide a safe environment for rescue/relief aircraft operations is normally limited to within 2,000 feet above the surface and within a 3-nautical-mile radius. Incidents occurring within Class B, Class C, or Class D airspace will normally be handled through existing procedures and should not require the issuance of a temporary flight restrictions NOTAM. Temporary flight restrictions affecting airspace outside of the U.S. and its territories and possessions are issued with verbiage excluding that airspace outside of the 12-mile coastal limits.

The FSS nearest the incident site is normally the "coordination facility." When FAA communications assistance is required, the designated FSS will function as the primary communications facility for coordination between emergency control authorities and affected aircraft. The ARTCC may act as liaison for the emergency control authorities if adequate communications cannot be established between the designated FSS and the relief organization. For example, the coordination facility may relay authorizations from the on-scene emergency response official in cases where news media aircraft operations are approved at the altitudes used by relief aircraft.

Air Traffic Control (ATC) Tower may authorize operations in a temporary flight restrictions area under its own authority only when flight restrictions are established under 14 CFR Section 91.137(a)(2) and (a)(3). The appropriate ARTCC/airport traffic control tower manager will, however, ensure that such authorized flights do not hamper activities or interfere with the event for which restrictions were implemented. However, ATC will not authorize local IFR flights into the temporary flight restrictions area.

To preclude misunderstanding, the implementing NOTAM will include specific and formatted information. The facility establishing a temporary flight restrictions area will format a NOTAM beginning with the phrase "FLIGHT RESTRICTIONS" followed by: the location of the temporary flight restrictions area; the effective period; the area defined in statute miles; the altitudes affected; the FAA coordination facility and commercial telephone number; the reason for the temporary flight restrictions; the agency directing any relief activities and its commercial telephone number; and other information considered appropriate by the issuing authority.

Published Visual Flight Rule (VFR) routes for transitioning around, under and through complex airspace such as Class B airspace were developed through a number of FAA and industry initiatives. All of the following terms, i.e., "VFR Flyway" "VFR Corridor" and "Class B Airspace VFR Transition Route" have been used when referring to the same or different types of routes or airspace. The following paragraphs identify and clarify the functionality of each type of route, and specify where and when an ATC clearance is required.

VFR Flyways and their associated Flyway Planning Charts were developed from the recommendations of a National Airspace Review Task Group. A VFR Flyway is defined as a general flight path not defined as a specific course, for use by pilots in planning flights into, out of, through or near complex terminal airspace to avoid Class B airspace. An ATC clearance is NOT required to fly these routes.

VFR Flyways are depicted on the reverse side of some of the VFR Terminal Area Charts (TAC), commonly referred to as Class B airspace charts. Eventually all TAC's will include a VFR Flyway Planning Chart. These charts identify VFR flyways designed to help VFR pilots avoid major controlled traffic flows. They may further depict multiple VFR routings throughout the area which may be used as an alternative to flight within Class B airspace. The ground references provide a guide for improved visual navigation. These routes are not intended to discourage requests for VFR operations within Class B airspace but are designed solely to assist pilots in planning for flights under and around busy Class B airspace without actually entering Class B airspace.

It is very important to remember that these suggested routes are not sterile devoid of other traffic. The entire Class B airspace, and the airspace underneath it, may be heavily congested with many different types of aircraft. Pilot adherence to VFR rules should be exercised at all times. Further, when operating beneath Class B airspace, communications should be established and maintained between your aircraft and any control tower while transiting the Class B, Class C, and Class D surface areas of those airports under Class B Airspace.

The design of a few of the first Class B airspace areas provided a corridor for the passage of uncontrolled traffic. A VFR corridor is defined as airspace through Class B airspace, with defined vertical and lateral boundaries, in which aircraft may operate without an ATC clearance or communication with air traffic control. These corridors are, in effect, a "hole" through Class B airspace. A classic example would be the corridor through the Los Angeles Class B airspace, which has been subsequently changed to Special Flight Rules airspace (SFR). A corridor is surrounded on all sides by Class B airspace and does not extend down to the surface like a VFR Flyway. Because of their finite lateral and vertical limits, and the volume of VFR traffic using a corridor, extreme caution and vigilance should be exercised. Because of the heavy traffic volume and the procedures necessary to efficiently manage the flow of traffic, it has not been possible to incorporate VFR corridors in the development or modifications of Class B airspace in recent years.

To accommodate VFR traffic through certain Class B airspace, such as Seattle, Phoenix and Los Angeles, Class B Airspace VFR Transition Routes were developed. A Class B Airspace VFR Transition Route is defined as a specific flight course depicted on a TAC for transiting a specific Class B airspace. These routes include specific ATC-assigned altitudes, and pilots should obtain an ATC clearance prior to entering Class B airspace on the route. These routes are designed to show the pilot where to position the aircraft outside of, or clear of, the Class B airspace where an ATC clearance can normally be expected with minimal or no delay. Until ATC authorization is received, pilots should remain clear of Class B airspace. On initial contact, pilots should advise ATC of their position, altitude, route name desired, and direction of flight. After a clearance is received, pilot should fly the route as depicted and, most importantly, adhere to ATC instructions.

Referring still to FIG. 1A, in one embodiment of the present invention, the RAS database 12 implements National Security Areas (NSA). National Security Areas consist of airspace of defined vertical and lateral dimensions established at locations where there is a requirement for increased security and safety of ground facilities. Pilots are requested to voluntarily avoid flying through the depicted NSA. When it is necessary to provide a greater level of security and safety, flight in NSA's may be temporarily prohibited by regulation under the provisions of 14 CFR Section 99.7. Regulatory prohibitions will be issued by ATA-400 and disseminated via NOTAM. Inquiries about NSA's should be directed to the Airspace and Rules Division, ATA-400.

In one embodiment of the present invention, the RAS database 12 of FIG. 1A implements a Special Use Airspace. Special use airspace consists of that airspace wherein activities should be confined because of their nature, or wherein limitations are imposed upon aircraft operations that are not a part of those activities, or both. Except for controlled firing areas, special use airspace areas are depicted on aeronautical charts.

In one embodiment of the present invention, the RAS database 12 of FIG. 1A implements a regulatory special use airspace that is established in 14 CFR Part 73 through the rulemaking process. FAA includes special use airspace descriptions. Special use airspace regions are charted on Instrument Flight Rule (IFR), or visual charts and include the hours of operation, altitudes, and the controlling agency.

In one embodiment of the present invention, the RAS database 12 of FIG. 1A implements a nonregulatory special use airspace, like a warning area. A warning area is an airspace of defined dimensions, extending from three nautical miles outward from the coast of the U.S., that includes activity that may be hazardous to nonparticipating aircraft. The purpose of such warning areas is to warn nonparticipating pilots of the potential danger. A warning area may be located over domestic or international waters or both.

In one embodiment of the present invention, the RAS database 12 of FIG. 1A implements a nonregulatory special use airspace, like military operations areas (MOA's). Military Operations Areas (MOA's) consist of airspace of defined vertical and lateral limits established for the purpose of separating certain military training activities from IFR traffic. Whenever a MOA is being used, nonparticipating IFR traffic may be cleared through a MOA if IFR separation can be provided by Air Traffic Control (ATC) Tower. Otherwise, ATC will reroute or restrict nonparticipating IFR traffic. Pilots operating under Visual Flight Rule (VFR) should exercise extreme caution while flying within a MOA when military activity is being conducted. The activity status (active/inactive) of MOA's may change frequently. Therefore, pilots should contact any Flight Service Station (FSS) within 100 miles of the area to obtain accurate real-time information concerning the MOA hours of operation. Prior to entering an active MOA, pilots should contact the controlling agency for traffic advisories.

In one embodiment of the present invention, the RAS database 12 of FIG. 1A implements a nonregulatory special use airspace, like an alert area. Alert areas are depicted on aeronautical charts to inform nonparticipating pilots of areas that may include a high volume of pilot training or an unusual type of aerial activity. Pilots should be particularly alert when flying in these areas. All activity within an alert area shall be conducted in accordance with CFR's, without waiver, and pilots of participating aircraft as well as pilots transiting the area shall be equally responsible for collision avoidance.

In one embodiment of the present invention, the RAS database 12 of FIG. 1A implements a nonregulatory special use airspace, like controlled firing areas (CFA's). CFA's include activities which, if not conducted in a controlled environment, could be hazardous to nonparticipating aircraft. The distinguishing feature of the CFA, as compared to other special use airspace, is that its activities are suspended immediately when spotter aircraft, radar, or ground lookout positions indicate an aircraft might be approaching the area. There is no need to chart CFA's since they do not cause a nonparticipating aircraft to change its flight path.

Referring still to FIG. 1A, in one embodiment of the present invention, the RAS database 12 implements a prohibited area. Prohibited areas include airspace of defined dimensions identified by an area on the surface of the earth within which the flight of aircraft is prohibited. Such areas are established for security or other reasons associated with the national welfare. These areas are published in the Federal Register and are depicted on aeronautical charts.

In one embodiment of the present invention, the RAS database 12 of FIG. 1A implements restricted areas. Restricted areas include airspace identified by an area on the surface of the earth within which the flight of aircraft, while not wholly prohibited, is subject to restrictions. Activities within these areas should be confined because of their nature or limitations imposed upon aircraft operations that are not a part of those activities or both. Restricted areas denote the existence of unusual, often invisible, hazards to aircraft such as artillery firing, aerial gunnery, or guided missiles. Penetration of restricted areas without authorization from the using or controlling agency may be extremely hazardous to the aircraft and its occupants. Restricted areas are published in the Federal Register and constitute 14 CFR Part 73.

ATC facilities apply the following procedures when aircraft are operating on an IFR clearance (including those cleared by ATC to maintain VFR-on-top) via a route which lies within joint-use restricted airspace. If the restricted area is not active and has been released to the controlling agency (FAA), the ATC facility will allow the aircraft to operate in the restricted airspace without issuing specific clearance for it to do so. If, on the other hand, the restricted area is active and has not been released to the controlling agency (FAA), the ATC facility will issue a clearance which will ensure the aircraft avoids the restricted airspace unless it is on an approved altitude reservation mission or has obtained its own permission to operate in the airspace and so informs the controlling facility. This applies only to joint-use restricted airspace and not to prohibited and nonjoint-use airspace. For the latter categories, the ATC facility will issue a clearance so that the aircraft will avoid the restricted airspace unless it is on an approved altitude reservation mission or has obtained its own permission to operate in the airspace and so informs the controlling facility. Restricted airspace is depicted on the en route chart appropriate for use at the altitude or flight level being flown. For joint-use restricted areas, the name of the controlling agency is shown on these charts. For all prohibited areas and nonjoint-use restricted areas, unless otherwise requested by the using agency, the phrase "NO A/G" is shown.

In one embodiment, as depicted in FIG. 3, the RAS 305 is modeled by using a cylindrical volume which is limited by a horizontal contour with upper 330 and lower 310 altitudes of the zone. The aircraft 320 instead of flying into the RAS 305, executes an avoiding maneuver and follows the trajectory 340, as disclosed in the U.S. Pat. No. 6,161,063, that is incorporated by reference herein.

More specifically, the '063 patent teaches avoidance of a column of turbulent air. The '063 patent discloses a method of automatically controlling an aircraft to avoid a vertical zone. The zone is modeled by a cylindrical volume which is limited by a horizontal contour with upper and lower altitudes of the zone. The points of entry and exit in the cylindrical volume are determined. A new flight altitude is calculated in order to avoid the zone. A point of change of altitude is calculated to reach an avoidance altitude. The new flight altitude is updated and the point of change of altitude is input into an automatic pilot. According to '063 patent, the avoidance method is particularly designed to be executed by a computer installed on board an aircraft. It is done by the automatic piloting device comprising a memory block. The memory block includes a recorded aircraft's scheduled trajectory comprising a lateral trajectory and a vertical profile. The lateral trajectory consists of a route formed of a succession of straight segments between the departure point and the destination point, and of transition trajectories making it possible to join one segment to another. The vertical profile indicates in particular the cruising altitude and the position of the point of descent towards the scheduled runway.

The '063 patent teaches a data transmission device capable of receiving meteorological information from a ground station. This device locates a zone of meteorological activity, for example, in which there is strong turbulence or considerable icing conditions. When such information is received, the computer executes a pre-loaded algorithm. The algorithm includes the following steps: (1) acquiring data delivered by the data transmission device; (2) delimiting a meteorological zone by a cylindrical volume defined by a horizontal contour and lower and upper altitudes (as shown in FIG. 3); (3) locating the scheduled route 315 by accessing the definition of the scheduled flight plan which is stored in the automatic piloting device; (4) sending a message intended for the display screen so as to warn the pilot that the route 315 to be traveled by the aircraft traverses a zone of meteorological activity; (5) determining an avoidance trajectory such as 340 which passes around the cylindrical volume 305; and (6) in case of autopiloting, executing the avoidance trajectory 340. The computer then stands by again for new information that locates a next zone of meteorological activity to be avoided.

The '063 patent also teaches how to execute an avoidance trajectory 340. More specifically, if avoidance is possible by flying above and below the avoidance 305 zone, and if the current altitude (alt.aircraft) of the aircraft is less than the optimum altitude (alt.opti), then upper avoidance is carried out, otherwise lower avoidance is carried out. In order to carry out an upper avoidance, the computer compares the optimum altitude (alt.opti) with the upper altitude (alt.upp.zone) of the avoidance zone. If the optimum altitude is greater than the upper altitude of the avoidance zone, the avoidance altitude (alt.avoid) corresponds to the optimum altitude (alt.opti). Otherwise, the avoidance altitude corresponds to the upper altitude (alt.upp.zone) of the zone with a safety margin. Execution of the algorithm continues in order to determine the position of the point of descent towards the runway.

Similarly, in order to carry out a lower avoidance, the computer examines whether the optimum altitude (alt.opti) is not less than the lower altitude (alt.low.zone) of the avoidance zone, the avoidance altitude (alt.avoid) corresponds to the lower altitude of the zone with a safety margin, otherwise it corresponds to the optimum altitude. The computer then determines the point of descent towards the runway.

In practice, the altitude to be complied with by the aircraft is calculated in the form of a flight level, the flight levels being spaced apart by 100 feet (30.48 m). Thus, the computer also determines the optimum, respectively maximum, flight levels, by rounding the calculated altitudes to the nearest, respectively lower, flight level. The upper altitude of the zone is in fact compared with the maximum flight level, whereas the lower altitude of the zone is compared with the value (alt.D) obtained by subtracting the height of three flight levels, for example, from the initially scheduled flight level, as well as with the minimum flight level. Likewise, the avoidance altitude is calculated in terms of flight level and the margin corresponding to a flight level.

FIG. 1D shows a navigational processor 100 in more details. In one embodiment of the present invention, the distance between the aircraft and the RAS is determined by an on-board restricted airspace controller 120 including a computer (not shown). In one embodiment, the restricted airspace controller receives the real time position coordinates, and velocity vectors of the aircraft from the located on-board Satellite Positioning System (SATPS) receiver 110.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). GPS satellites transmit both a C/A code and a P-code. There are a total of 32 pseudo random (PRN) C/A codes, with each satellite generating a different C/A code. The code modulations that produce either a P-code or a C/A code are impressed onto the L1 carrier and the L2 carrier.

The deployment of additional frequencies is being planned by the DOD. More specifically, DOD is exploring several options to maintain, or improve, the performance of civilian applications of GPS without compromising military utilities. Indeed, the civilian community does not have a second frequency. Today, corrections are based upon L2, which is a military frequency, and subject to DOD use and control. The addition of L5 to the GPS constellation on the Block IIF satellites would, at a minimum, assure the civilian community of the existence of reliable dual frequency transmissions.

As a result, a new GPS frequency, L5, is being considered for civil sector uses in order to reserve L2 for military purposes. This new frequency is targeted to provide both carrier phase and C/A-code range information. Two frequencies are proposed for L5; the first being 1207 MHz yielding a 368 MHz separation from L1, and the second being 1309 MHz having a separation of 266 MHz from L1.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where $k (=1, 2, \ldots 24)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

The European Union plans to develop by 2008 the system of navigation and positioning by satellite designed exclusively for civil purposes—the GALILEO system. GALILEO should enable each individual, by way of a small, cheap individual receiver, to know his or her position to within a few meters, with guaranteed continuity of transmission of the signal. The GALILEO project, supported by the European Space Agency, aims to launch a series satellites at around 20 000 km to be monitored by a network of ground control stations, in order to provide world cover. GALILEO system should be integrated into the existing GNSS—Global Navigation Satellite System, comprising at present time GPS and GLONASS satellite systems.

Reference to a Satellite Positioning System or SATPS herein refers to a Global Positioning System, to a Global Orbiting Navigation System, to a GALILEO project, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given below discussion, (applicable to any satellite navigational system, but focused on GPS applications to be substantially specific) can be found in "Global Positioning System: Theory and Applications", Volume II, Chapters 1 and 5, by Bradford W. Parkinson and James J. Spilker Jr., published by the American Institute of Aeronautics and Astronautics, Inc. in 1996.

Typically, GPS based positions are calculated using the World Geodetic System of 1984 (WGS84) coordinate system. These positions are expressed in Earth Centered Earth Fixed (ECEF) coordinates of X, Y, and Z axes. These positions are often transformed into latitude, longitude, and height relative to the WGS84 ellipsoid.

Referring still to FIG. 1D, in one embodiment of the present invention, the Satellite Positioning System (SATPS) receiver 110 further includes a Global Positioning System (GPS) receiver. In another embodiment of the present invention, the (SATPS) receiver 110 further includes a Global Navigational System (GLONASS) receiver. In an additional embodiment of the present invention, the (SATPS) receiver 110 further includes a combined GPS/GLONASS system receiver 110.

In one embodiment of the present invention, the Global Positioning System (GPS) receiver 10 further includes a differential Global Positioning System (DGPS) receiver 110 configured to receive a set of differential corrections in order to substantially continuously obtain a set of real time position coordinates of the aircraft with an increased accuracy.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over a reasonable distance. DGPS also significantly improves the "integrity" of GPS for all classes of users, because it reduces the probability that a GPS user would suffer from an unacceptable position error attributable to an undetected system fault.

Most DGPS systems use a single reference station to develop a scalar correction to the code-phase measurement. If the correction is delivered within 10 seconds, and the user is within 1000 km, the user accuracy should can be between 1 and 10 meters, decreasing as the distance between the reference station and the user receiver increases.

Users with very stringent accuracy requirements may be able to use a technique called carrier-phase DGPS or CDPGS. These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy.

In one embodiment of the present invention, the differential Global Positioning System (DGPS) further includes a velocity block configured to substantially continuously obtain a set of real time velocity vectors of the aircraft. The components of the velocity vector are usually determined as a direct result of a GPS solution, which is equivalent to the Doppler shift of each received satellite signal.

In one embodiment of the present invention, the differential Global Positioning System (DGPS) further includes an acceleration block configured to substantially continuously obtain a set of real time acceleration vectors of the aircraft. Acceleration is normally not determined as a direct result of a GPS solution, as opposed to the velocity vector. The acceleration vector is normally estimated as the first-order derivation of a velocity vector with respect to time coordinate. As was stated above, the velocity vector is determined as the direct result of the GPS solution.

Referring still to FIG. 1D, in one embodiment of the present invention, the restricted airspace (RAS) controller 120 is coupled to the (SATPS) 110, and coupled to the (TAP-RAS) database 115. In this embodiment, the RAS controller is configured to receive a set of real time data including the set of coordinates that determines the RAS and the set of real time position coordinates and vector coordinates of the aircraft; and is configured to analyze the set of real time data in order to substantially continuously generate a real time set of commands 180.

In one embodiment of the present invention, the apparatus 100 of the present invention also includes an aircraft controller 145 coupled to the RAS controller 120. The aircraft controller 145 is configured to receive the real time set of commands 180 and is configured to navigate the aircraft utilizing the real time set of commands 180 around the RAS.

For example, the RAS controller 120 of an aircraft approaching the RAS 225 (of FIG. 2) generates a set of commands 180 including the limitations on both a velocity vector and on an acceleration vector of the aircraft depending on the distance between the aircraft and the RAS. For instance, when approaching the RAS 225, the speed of the aircraft is controlled in such a way as the aircraft has a lesser minimum speed and a lesser minimum acceleration at the warning range 205, as compared with a minimum speed and a minimum acceleration at the warning range 215. This is due to the fact that the aircraft has to execute a steeper avoiding maneuver at the warning range 205 as compared with an avoiding maneuver it has to execute at the warning range 215.

A more detailed disclosure of how a military aircraft executes an avoiding maneuver is given below. Indeed, national security depends largely on the deterrent effect of our airborne military forces. To be proficient, the military services should train in a wide range of airborne tactics. One phase of this training involves "low level" combat tactics. The required maneuvers and high speeds are such that they may occasionally make the see-and-avoid aspect of Visual Flight Rule (VFR) flight more difficult without increased vigilance in areas including such operations. In an effort to ensure the greatest practical level of safety for all flight operations, the Military Training Route (MTR) program was conceived. The MTR program is a joint venture by the FAA and the Department of Defense (DOD). MTR's are mutually developed for use by the military for the purpose of conducting low-altitude, high-speed training. FAA at the Great Lakes Region (AGL) developed the routes above 1,500 feet that are to be flown, to the maximum extent possible, under Instrument Flight Rule (IFR). The routes at 1,500 feet AGL and below are generally developed to be flown under Visual Flight Rule (VFR).

Generally, MTR's are established below 10,000 feet MSL for operations at speeds in excess of 250 knots. However, route segments may be defined at higher altitudes for purposes of route continuity. For example, route segments may be defined for descent, climbout, and mountainous terrain. There are IFR and VFR routes as follows: (a) IFR Military Training Routes-(IR), wherein operations on these routes are conducted in accordance with IFR regardless of weather conditions; and (b) VFR Military Training Routes-(VR), wherein operations on these routes are conducted in accordance with VFR except flight visibility shall be 5 miles or more; and flights shall not be conducted below a ceiling of less than 3,000 feet AGL. Military training routes are identified and charted as follows:

(a) MTR's with no segment above 1,500 feet AGL shall be identified by four number characters; e.g., IR1206, VR1207.

(b) MTR's that include one or more segments above 1,500 feet AGL shall be identified by three number characters; e.g., IR206, VR207.

(c) Alternate IR/VR routes or route segments are identified by using the basic/principal route designation followed by a letter suffix, e.g., IR008A, VR1007B, etc.

The FLIP includes charts and narrative descriptions of these routes. This publication is available to the general public by single copy or annual subscription from: NACO Distribution Division, AVN-530; Federal Aviation Administration 6501 Lafayette Avenue; Riverdale, Md. 20737-1199. This DOD FLIP is available for pilot briefings at FSS and many airports.

Nonparticipating aircrafts are not prohibited from flying within an MTR; however, extreme vigilance should be exercised when conducting flight through or near these routes. Pilots should contact FSS's within 100 NM of a particular MTR to obtain current information or route usage in their vicinity. Information available includes times of scheduled activity, altitudes in use on each route segment, and actual route width. Route width varies for each MTR and can extend several miles on either side of the charted MTR centerline. Route width information for IR and VR MTR's is also available in the FLIP AP/1B along with additional MTR (slow routes/air refueling routes) information. When requesting MTR information, pilots should give the FSS their position, route of flight, and destination in order to reduce frequency congestion and permit the FSS specialist to identify the MTR which could be a factor.

Referring still to FIG. 1D, the RAS controller 120 can be implemented as a general purpose computer having a pre-loaded software program, or as an application specific integrated circuit (ASIC-RAS-controller). Similarly, the aircraft controller 145 can be implemented as an application specific integrated circuit (ASIC-aircraft-controller), or as a general purpose computer having a pre-loaded software program. Alternatively, the RAS controller 120 functionality can be implemented within the hardware that implements the aircraft controller 145, or an autopilot itself (not shown).

Referring still to FIG. 1D, in one embodiment of the present invention, the TAP-RAS database 115 further includes a set of reference points. The aircraft itself also includes at least one reference point. In this embodiment of the present invention, the tamper-proof apparatus 100 further includes a sensor 180 configured to substantially continuously measure a set of real time vectors. Each such real-time vector includes a real-time vector between at least one reference point in the TAP-RAS database and at least one reference point of the aircraft. In one embodiment, the sensor 180 further includes a laser sensor.

The U.S. Pat. No. 5,465,142 discloses a laser radar subsystem for range and directional information. The '142 patent is incorporated herein in its entirety. More specifically, '142 patent discloses a system for sensing objects in the flight path of an aircraft and alerting the pilot to their presence. A laser radar of '142 patent emits a beam of laser energy, receives returns from objects, and processes the returns to produce range data related to the range of the objects from the aircraft. A scanning subsystem scans the beam and produces directional information related to the instantaneous direction of the beam relative to the aircraft. Processor circuitry controls operation, processes the range data and directional information with instrumentation data from the avionics system, produces video information related to the range, direction, and type of the objects, and interfaces the video information to the video display system of the '142 patent.

In another embodiment, the sensor 180 includes a microwave sensor, or a radar, that functions similarly to the laser sensor disclosed in the '142 patent.

Referring still to FIG. 1D, in one embodiment of the present invention, the RAS controller 120 further includes a message block (not shown) configured to substantially continuously generate a set of real time messages. A pilot warning device 135 coupled to the RAS controller 120 is configured to receive the set of real time messages, and configured to present the set of real time messages in audio and visual format on an audio and video display (not shown). When the aircraft starts approaching the RAS, the set of real time messages includes a set of different warning messages, including a signal to the pilot to start avoiding maneuver, as was fully discussed above.

In one embodiment of the present invention, the on-board apparatus 100 includes the laser radar 180, and the pilot warning device 135 displays the video information related to the range of the aircraft to the RAS, and the direction of the aircraft relative to RAS.

In one embodiment of the present invention, the on-board apparatus 30 of FIG. 1B includes a tamper-proof navigation processor 32, and a tamper-proof overriding processor 36.

In this tamper-proof embodiment of the present invention, FIG. 1D shows in more details the tamper-proof navigational processor 34 including a tamper-proof satellite receiver 110, a tamper-proof restricted airspace controller 120, and a-tamper-proof aircraft controller 145.

Referring still to FIG. 1D, in one tamper-proof embodiment of the present invention, the tamper-proof/tamper-resistant Satellite Positioning System (TAP-SATPS) receiver 110 further includes a tamper-proof/tamper-resistant Global Positioning System (TAP-GPS) receiver. In another tamper-proof embodiment of the present invention, the (TAP-SATPS) receiver 110 further includes a tamper-proof/tamper-resistant Global Navigational System (TAP-GLONASS) receiver. In an additional tamper-proof embodiment of the present invention, the (TAP-SATPS) receiver 110 further includes a tamper-proof/tamper-resistant combined GPS/GLONASS system (TAP-GPS/GLONASS) receiver 110.

To make the GPS receiver equipment tamper-proof it is sufficient to locate the equipment in a secured location on board of the aircraft, thus preventing a potential terrorist to remove the source of power to the electronics. By securing equipment in the cockpit so that it cannot be accessed except with special tools, keys, or locks, a potential terrorist is prevented from inhibiting the signal from feeding the auto-pilot or other related processors in the cockpit. Finally, by locating the GPS antenna in a place that is difficult to access, a potential terrorist is prevented from inhibiting the satellite signals from reception by the satellite receiver. To this end, it should be relatively easy to check whether the foreign material such as aluminized mylar or other metallic-based thin covering, is used to cover the satellite antenna.

The hardest challenge to address is that caused by a GPS jammer. The jammer introduces noise at a power level that is much higher than the GPS signal, making it impossible for the GPS receiver to ever achieve any kind of synchronization or reception. The best alternatives are: (a) to locate the GPS receiver at the top of the rear tail fin (vertical stabilizer) so that it is as far away from the various places that a jammer could easily be located on board, such as the cargo hold or the passenger area, or the cockpit; or (b) to use a GPS receiver that is jammer resistant, which involves using more sophisticated signal processing well known in the satellite receiver art, typically using multi-level analog-to-digital (A-D) convertors; see, for examples and reference citations, U.S. Pat. No. 6,021,156 by Wagner, U.S. Pat. No. 5,872,540 by Casabona, and U.S. Pat. No. 6,219,376 by Zhodzishsky.

In one tamper-proof embodiment of the present invention, the tamper-proof Global Positioning System (TAP-GPS) receiver 110 further includes a differential tamper-proof Global Positioning System (DIF-TAP-GPS) receiver 110 configured to receive a set of differential corrections in order to substantially continuously obtain a set of real time position coordinates of the aircraft with an increased accuracy. Please, see discussion above.

In one tamper-proof embodiment of the present invention, the differential tamper-proof Global Positioning System (DIF-TAP-GPS) further includes a velocity block configured to substantially continuously obtain a set of real time velocity vectors of the aircraft. The components of the velocity vector are usually determined as a direct result of a GPS solution, which is equivalent to the Doppler shift of each received satellite signal.

In one tamper-proof embodiment of the present invention, the differential tamper-proof Global Positioning System (DIF-TAP-GPS) further includes an acceleration block configured to substantially continuously obtain a set of real time acceleration vectors of the aircraft. As was disclosed above, the acceleration vector is normally estimated as the first-order derivation of a velocity vector with respect to time coordinate.

Referring still to FIG. 1D, in one tamper-proof embodiment of the present invention, the tamper-proof restricted airspace (TAP-RAS) controller 120 is coupled to the (TAP-SATPS) 110, and coupled to the (TAP-RAS) database 115. In this embodiment, the TAP-RAS controller is configured to receive a set of real time data including the set of coordinates that determines the RAS and the set of real time position coordinates and vector coordinates of the aircraft; and is configured to analyze the set of real time data in order to substantially continuously generate a real time set of commands 180.

In one tamper-proof embodiment of the present invention, the tamper-proof apparatus 100 of the present invention also includes a tamper-proof aircraft controller 145 coupled to the TAP-RAS controller 120. The tamper-proof aircraft controller 145 is configured to receive the real time set of commands 180 and is configured to navigate the aircraft utilizing the real time set of commands 180 around the RAS.

In one tamper-proof embodiment of the present invention, the TAP-RAS controller 120 is implemented as a tamper-proof general purpose computer having a pre-loaded software program. In another tamper-proof embodiment of the present invention, the TAP-RAS controller 120 is implemented as a tamper-proof application specific integrated circuit (TAP-ASIC-RAS-controller). Similarly, the TAP aircraft controller 145 can be implemented as a tamper-proof application specific integrated circuit (TAP-ASIC-aircraft-controller), or as a tamper-proof general purpose computer having a pre-loaded software program.

To make the restricted airspace (TAP-RAS) controller 120 a tamper-proof one, it is sufficient to locate this equipment in a secured location on board of the aircraft, like a cockpit or the forward electronics section that houses the weather radars in the nose cone, thus preventing a potential terrorist to get access to this device, and thus preventing a potential terrorist from tampering with this device. Only an authorized personal being equipped with special tools, keys, or locks can get access to this device for the purposes of repair, and other legitimate purposes. Similarly, the tamper-proof aircraft controller 145 can be made a tamper-proof one by using similar methods.

Referring still to FIG. 1D, in one tamper-proof embodiment of the present invention, the TAP-RAS controller 120 further includes a tamper-proof message block (not shown) configured to substantially continuously generate a set of real time tamper-proof messages. A tamper-proof pilot warning device 135 coupled to the TAP-RAS controller 120 is configured to receive the set of real time tamper-proof messages, and configured to present the set of real time tamper-proof messages in audio and visual format on a tamper-proof audio and video display (not shown). When the aircraft starts approaching the RAS, the set of real time tamper-proof messages includes a set of different tamper-proof warning messages, including a tamper-proof signal to the pilot to start avoiding maneuver, as was fully discussed above.

In one tamper-proof embodiment of the present invention, the tamper-proof pilot warning device 135 is securely located on board of the aircraft, like in the cockpit, thus preventing a potential terrorist to get access to this device, and thus preventing a potential terrorist from tampering with the messages generated by the warning device 135. Only authorized personal equipped with special tools, keys, or locks can get access to the warning device for the purposes of repair, and other legitimate purposes. Similarly, the tamper-proof audio and video display (not shown) can be a made a tamper-proof one.

The warning messages can be encoded while generated, and decoded before being displayed in order to make them tamper-proof. See full discussion above how to make signals tamper-proof by using different encoding and decoding techniques. Thus, a potential terrorist would not be able to tamper with these messages.

Referring still to FIG. 1D, in one tamper-proof embodiment of the present invention, the tamper-proof apparatus 100 further includes a tamper-proof air-to ground data link device 125 coupled to the TAP-RAS controller 120 and coupled via a physical link 155 to a ground-control center (not shown) to communicate data between the tamper-proof apparatus 100 located on board of the aircraft and the ground-control center, and vice versa. In one embodiment, the ground control center includes a Flight Service Station (FSS). See the previous discussion above.

In one embodiment of the present invention, the ground-control center continuously monitors the tamper-proof on-board apparatus 100 in order to determine whether it was tampered with. If this was the case, the ground-control center utilizes the air-to-ground data link to reasonably quickly inform the pilot that the tampering event took place. It can also request the TAP-RAS controller 120 to calculate the position coordinates of the aircraft and the speed vector of the aircraft at the time when the tampering event took place.

Referring still to FIG. 2, in one embodiment of the present invention, the apparatus 100 (of FIG. 1D) is configured to substantially continuously receive a set of real time signals including the position coordinates of the RAS 225 from at least one secure pseudolite 255 located in the RAS 225. In one embodiment, the secure pseudolite 255 is configured to substantially continuously transmit a set of real time pseudolite signals including the position coordinates of the pseudolite itself. In another embodiment, the secure pseudolite is configured to substantially continuously transmit a set of real time pseudolite signals including the position coordinates of the pseudolite itself and, in addition, a buffer range (for example, range 215) around the RAS 225.

Pseudolites (PLs) are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a PL provides an additional ranging source to augment the GPS constellation.

A secure GPS pseudolite, including an anti-spoof and anti-jam GPS pseudolite, can be constructed using any one from a variety of well-known families of secure spreading codes. The codes, if kept secret, make the pseudolite signals relatively immune to spoofing and jamming.

In one embodiment, the secret spreading code includes a P(Y) code. In this embodiment, the on-board apparatus 100 includes a GPS receiver 10 that is capable of receiving the P(Y) code. The P(Y) code includes the set of coordinates of the pseudolite positioned in the restricted airspace, including the origin, the range, and the closure. These parameters are used by the on-board aircraft controller 145 (of FIG. 1D) to navigate an aircraft in such a way as to avoid the predetermined and restricted air space (RAS).

Referring still to FIG. 2, the RAS is modeled by a cube 225 and a number of warning radiuses 215, 210, and 205. The first radius $R_1$ 205 indicates a first warning distance when the warning signal about the approaching RAS is generated. The second warning distance is defined by the second radius $R_2$ 210. This is a distance when the aircraft should undertake an avoiding maneuver having a first velocity vector $V_1$. The next radius $R_3$ 215 is an absolute threshold beyond which the penetration of the aircraft into the RAS 225 is prohibited. At this radius $R_3$ 215 the aircraft has to undertake the avoiding maneuver probably having a higher speed as compared with the speed that the aircraft has at the second radius distance $R_2$ 210. Thus, the second velocity vector $V_2$ is such that $\|V_2\| \geq \|V_1\|$.

In one embodiment, a single pseudolite located in the position 285 (of FIG. 2) defines a spherical restricted air space (RAS) centered on the pseudolite located in the origin 285 with a radius 295 defined in the pseudolite data signal. Thus, in this embodiment, the cube RAS 225 is modeled by a sphere RAS with the origin 285 and radius 295. It is also possible for the pseudolite to be located elsewhere and still transmit the data set that defines the RAS.

In another embodiment, an arbitrary shaped RAS can be defined by a single pseudolite located in position 285. In this embodiment, the single pseudolite is used as one-way communication link. The data included in the pseudolite signal (pseudolite almanac) comprises a geometrical description (in GPS coordinates) of an arbitrary shaped RAS. This set of data then serves exactly the same purpose (for a local area) as the set of coordinates from the TAP-RAS database 115 in the on-board embodiment. The pseudolite can be located anywhere in the vicinity of the RAS, or anywhere so that reception of its signals can occur at points far enough away so that the maneuvers needed to avoid this RAS can still be implemented.

However, a potential user of pseudolite ranging signals should address the "near-far" problem associated with the pseudolite signal level. One solution to the near-far problem is to configure a set of pseudolite operating within the GPS frequency bands ($L_1$: 1565–1585 MHz or $L_2$: 1217–1237 MHz) to serve a limited area with a power level low enough to preclude appreciable interference to standard GPS signals. Another solution to the near-far problem is to design the pseudolite signal configuration to operate within $L_1$ band and mitigate or virtually eliminate the near-far issue.

In one embodiment, the dynamic range of airborne GPS receiver 110 (of FIG. 1D) is such that there will be no significant near-far problem, that is no significant interference between the received satellite signals and the received secure pseudolite signals. In this embodiment, a signal transmitted by a secure-code pseudolite is received by on-board GPS 10 to give an origin of RAS, a range of RAS modeled by a sphere, and a closure. The closure is the minimum distance to the RAS sphere after which the aircraft is to undertake an avoidance maneuver.

In one additional embodiment, as shown in FIG. 2, a network of pseudolite located in the positions 255, 245, 265, and 275 is used to transmit the same geometrical information as a single-pseudolite system including a geometrical description (in GPS coordinates) of an arbitrary shaped RAS. The advantage of having a network of dispersed pseudolites is to further mitigate the near-far problem.

However, the better performance can be achieved by using a split-spectrum secure pseudolite. The operation of pulsed pseudolites has been in published literature and is well known to a person skillful in the art of satellite navigation. For reference, please, see U.S. Pat. No. 6,239,743, issued to Lennen, and U.S. Pat. No. 6,058,135, issued to Spliker.

In one embodiment of the present invention, a split-spectrum pseudolite (for example, located in position 255 of RAS, as shown in FIG. 2) is configured to generate a split-spectrum sideband signal used to securely transmit its own position coordinates to the on-board GPS receiver 110. Thus generated split-spectrum sideband signal minimizes interference with the reception of satellite signals by the on-board GPS receiver 110.

Conflicts may arise between closely located RASs and approved flight approaches to airports. If such a situation arises, a so called "exception" method is useful. Using this method, if the RAS controller 120 determines that the aircraft is closely following an approved airport approach, the RAS can be penetrated without an evasive action. The adherence to an approved approach is especially clear when a LAAS (Local Area Augmentation System) is available. LAAS systems are likely to be used at commercial airports just in few years.

Referring still to FIG. 1D, in one embodiment of the present invention, the restricted airspace controller 120 is configured to receive and analyze a set of real time data including the set of coordinates that determines the RAS and the set of real time position coordinates in order to substantially continuously generate the likelihood of penetration of the RAS based on the current flight path, RAS position, and the current speed and acceleration of the aircraft. In this embodiment, the restricted airspace controller 120 generates a set of real time commands for executing evasive maneuvers to avoid the RAS, and an estimate of the flight time until such execution should begin.

In one embodiment, the tamper-proof restricted airspace controller 120 is configured to calculate a vector from based on the current flight path of the aircraft and determines if that vector intercepts the RAS at any point of the surface of the RAS. If such a penetration of the RAS surface, as defined by the RAS database, occurs, the warning device 135 issues an emergency warning signal to the cockpit both audibly and/or visually to warn the pilot. In another embodiment, the tamper-proof restricted airspace controller 120 is configured to determine the amount of time necessary to take evasive maneuvers, and the point in space and time whereby these maneuvers should begin in order to avoid penetrating the RAS, and is configured to calculate the time remaining before such maneuvers should begin. For the detailed description of evasive maneuvers, please see the referenced above '063 patent.

FIG. 1C depicts an overriding processor 50 including a memory 58, a processor 60, a biometric sensor 59, and a command generator 62. The overriding processor 50 is configured to generate a valid overriding command upon verifying authenticity of a pilot that issues an overriding command. If a valid overriding command is generated, the navigational processor 14 can penetrate the RAS in certain instances.

In one embodiment of the present invention, the overriding processor 50 further includes a biometric authentication sensor configured to validate the overriding command. In one embodiment, the biometric authentication sensor 59 including an eye retina authentication sensor 52, a voice authentication sensor 54, a palm authentication sensor 56 can be implemented by using the biometrical sensors employed in the U.S. Pat. No. 6,225,890, issued to Murphy. The '890 patent discloses a system for restricting use of a vehicle by a selected vehicle operator to permitted time intervals and permitted vehicle travel corridors. The '890 patent is incorporated by reference herein. The '890 utilizes the biometrical sensors to identify the driver by a fingerprint, a facial scan, a retinal scan, or a voice sample, or any combination thereof. A particularly useful combination is the joint use of voice, since the person must be alive to speak, and a retinal or iris scan, since the person's face needs to be put in a particular space/location to operate the scanner, and such a position could require standing or bending over, each in a way that would be difficult to do with an unconscious person.

More specifically, U.S. Pat. No. 4,817,432, issued to Wallace et al, discloses an ultrasonic scanner for measuring the corneal thickness and axial length of a human eye that is presented to the system. U.S. Pat. No. 5,222,152; and U.S. Pat. No. 5,230,025, issued to Fishbine et al, disclose portable fingerprint scanning apparatus that optically scans, records and transmits fingerprint images over a wireless channel to a mobile unit for analysis and verification. U.S. Pat. No. 5,229,764, issued to Matchett et al, discloses a biometric authentication matrix that simultaneously identifies one or more biometric indicia, including thumbscan, digital photo, voiceprint and fingerprint(s). U.S. Pat. No. 5,259,025 and U.S. Pat. No. 5,268,963, issued to Monroe et al, disclose use of a card including facial representation, fingerprint, cursive signature, voice print and retinal eye scan for personal identification. U.S. Pat. No. 5,280,527, issued to Gulhman et al, discloses provision of a biometric system that receives and analyzes a token having a time varying code and including biometric information on a person's voiceprint, cursive signature, fingerprint and similar indicia. U.S. Pat. No. 5,291,560, issued to Daugman, discloses an iris scanner for an eye that provides an "optical fingerprint." U.S. Pat. No. 5,335,288 and U.S. Pat. No. 5,483,601, issued to Faulkner et al, disclose a system that receives and analyzes a silhouette of a person's hand, plus a scanned portion of the hand, for personal identification. U.S. Pat. No. 5,563,453, issued to Gagne et al, discloses a fingerprint identifier that uses a 24-byte code for storing this information. U.S. Pat. No. 5,469,506, issued to Berson et al, discloses provision of an identification card including biometric information, such as a fingerprint or a cursive signature on the alleged holder of the card; the holder's own biometric characteristics are scanned in and compared with the information contained on the card. U.S. Pat. No. 5,534,855, issued to Shockley et al, discloses a system that receives and analyzes biometric indicia to determine which tasks a person is authorized to perform. U.S. Pat. No. 5,579,909, issued to Deal, discloses use of a thumbprint scanning and recognition system to allow access to a locked box that may contain one or more dangerous instruments, such as firearms or other weapons. U.S. Pat. No. 5,586,171, issued to McAllister et al, discloses use of a voice recognition system that responds to and analyzes video data presented in response to prompting of a person. U.S. Pat. No. 5,594,806, issued to Colbert, analyzes the contour of knuckles of a hand that is presented for personal identification. U.S. Pat. No. 5,638,832, issued to Singer et al, discloses provision of a small liquid crystal visual display, implanted just beneath the epidermis in the human skin, to provide a readable display for continuous biosensor information or for human "tagging."

Referring still to FIG. 1C, the face recognition sensor 53 can be implemented by using the face recognition techniques developed by MIT. For reference, please, see MIT Technology Review, "Visualize: Face Recognition", November 2001.

A few techniques exist to match known facial profiles against those of strangers in a crowd or to verify a person's claimed identity, as at an ATM. The most important are: local feature analysis, developed by Joseph Atick, who founded Jersey City, NJ-based Visionics; and eigenface, first demonstrated at Helsinki University of Technology, and later developed at MIT, and currently marketed by Visage Technology of Littleton, Mass.

A system based on local feature analysis uses a camera and computer to identify a person in a crowd. First it scans a field of view for shapes that could be faces. It then searches for facial features like those already stored in its memory. To be sure the eyes, nose and mouth belong to a living being—and not a mannequin—the program looks for eye-blinks or other telltale facial movements. The system then analyzes the pixels that make up the face image. It compares the darkness of each pixel to that of its neighbors, looking for areas where abrupt differences in value radiate outward from a single pixel. These changes can occur between the eyebrows and skin, the eyes and eyelids, or on features that protrude, such as the cheekbones and nose. The system plots the location of each pixel, known as an "anchor point," then connects the dots, forming a mesh of triangles. It measures the angles of each triangle and comes up with a number made of 672 ones and zeroes that identifies the face. The program attempts to match that number to a similar one in its database. There can never be a perfect match, so the program ranks how confident it is about the identification. And since the program plots the anchor points by bone structure, disguises such as beards, makeup and eyeglasses won't fool it.

Like feature analysis, the eigenface method also reduces a face to a number. But instead of looking at a collection of facial features locally, it examines the face as a whole. First it averages out a database of head shots to produce one composite face. Then it compares the face being identified to the composite. An algorithm measures how much the target face differs from the composite and generates a 128-digit personal identification number based on the deviation. The information in these articles and patents is incorporated by reference herein in its entirety.

FIG. 4A is a flow chart 350 of a method of the present invention for navigating an aircraft using an on-board apparatus of FIG. 1A, or on-board tamper-proof apparatus of FIG. 1B. At initial step 354, an authentication process is continuously performed to verify the identity of a pilot using a set of biometric sensors 59 like the palm sensor 56, the voice identification sensor 54, the eye retina sensor 52, and the face recognition sensor 53, as shown in FIG. 1C.

It is an emergency situation if the identity of a pilot is not confirmed (logical arrow 360). In one embodiment, if this is the case, the autopilot should take over and undertake an emergency landing—step 358 of FIG. 4A.

If the identity of pilot is confirmed using the biometric sensors (test 356), the issue is whether the overriding command is generated (step 364) by the overriding processor 36 (of FIG. 1B).

If an overriding command is not generated (logical arrow 369), the on-board apparatus 10 of FIG. 1A, (or, in the tamper-proof embodiment of the present invention, the on-board tamper-proof apparatus 30 of FIG. 1B) navigates the aircraft around RAS in a restricted air space mode (RAS-mode) (step 374). If, on the other hand, an overriding command is generated by the overriding processor 16 of FIG. 1A (or, by the tamper-proof overriding processor 36 of FIG. 1B in the tamper-proof embodiment of the present invention) (logical arrow 365), the navigational processor 14 of FIG. 1A (or, in the tamper-proof embodiment of the present invention, the tamper-proof navigation processor 32 of FIG. 1B) navigates the aircraft in an overriding mode (RAS-override-mode) (step 366). If this is the case, either the pilot can take over the controls and perform his own evasive maneuvers, or not, or he can leave the autopilot engaged, and the autopilot will take commands for performing the evasive actions from the RAS navigational controller. See discussion below.

Preferably, the step of authentication of the pilot's identity (step 354) should be performed substantially continuously. Therefore, the steps (354–374) are preferably repeated.

FIG. 4B is a flow chart 400 of the method of the present invention of navigating aircraft around RAS in the (RAS-mode) using the on-board navigational processor apparatus 14 of FIG. 1A, (or, in the tamper-proof embodiment of the present invention, using the on-board tamper-proof navigational processor 32 of FIG. 1B).

In the tamper-proof embodiment of the present invention, the RAS data is downloaded from the on-board database 115 (of FIG. 1DF) at step (404). At step 406, the tamper-proof Satellite Positioning System (TAP-SATPS) receiver 110 (of FIG. 1D) located on board of the aircraft substantially continuously obtains a set of real time position coordinates of the aircraft. By analyzing a set of real time data including the set of coordinates that determines the RAS, and the set of real time position coordinates of the aircraft (performed at step 408 by the TAP-RAS controller 120), a real time set of commands is generated.

FIG. 4C shows a flow chart 420 of a step of analyzing the set of real time data including the set of coordinates that determines the RAS, and the set of real time position coordinates of the aircraft. The RAS controller 120 substantially continuously generates a likelihood of penetration of any RAS in an nearby region based on allowable closest approach (step 426). Please, see the discussion above. The RAS controller 120 also estimates whether the likelihood of penetration of the RAS exceeds a first predetermined likelihood threshold. The likelihood threshold is a real time variable depending on the real time speed and real time acceleration of the aircraft and designed to guarantee sufficient time for the autopilot to execute the set of evasive maneuvers by the aircraft in order to avoid penetration of the RAS. If the likelihood of penetration of the RAS exceeds the first predetermined threshold (test condition 428), the RAS controller 120 generates a set of real time commands that the aircraft controller 145 utilizes for execution a set of evasive maneuvers to avoid the RAS (step 434). Steps (424–434) are preferably repeated.

FIG. 4D is a flow chart 450 that illustrates the step of generating a set of commands to take an evasive action if the likelihood of penetration of the RAS exceeds the first predetermined threshold (test condition 428). In one embodiment, the RAS controller 120 calculates a penetration vector by using a flight path of the aircraft (step 454). See the '063 patent for details related to calculation of the penetration vector. At the next step (458), the RAS controller 120 estimates a likelihood of interception a surface of the RAS by the penetration vector. If the likelihood of penetration of the surface of RAS by the penetration vector exceeds a second predetermined threshold (test condition 460 is satisfied), the RAS controller generates a set of emergency warning commands (step 464), and calculates a set of evasive parameters (step 466). The steps (454–464) are preferably repeated. The steps of presenting the warning commands audibly and/or visually to the pilot, determining the amount of time necessary to take evasive maneuvers in order to avoid penetration of the RAS; and calculating the amount of time remaining before the set of maneuvers is executed are not shown.

Referring still to FIG. 4B, at step 410, if there is no need to take evasive maneuvers, the aircraft is navigated around the RAS by employing the TAP aircraft controller 145 (of FIG. 1D ) that uses the set of real time commands.

In one embodiment of the present invention, as depicted in a flow chart 500 of FIG. 5, at step 504, the tamper-proof apparatus is continuously monitored by the ground-control station in order to determine whether it was tampered with. As was stated above, in one embodiment of the present invention, this operation can be performed by the Flight Service Station, or FSS, using the air-to-ground link device 125.

If the tamper-proof apparatus was tampered with, that is if the test condition 506 is satisfied, the next step 508, as indicated by the logical arrow 512, is to send a set of pertinent data to the FSS using the aircraft-ground link 155. In one embodiment, the set of pertinent data includes: a flight information, an aircraft ID number, a time coordinate when the tampering event occurred, a set of position coordinates of the aircraft, and a speed vector of the aircraft at the time when the tampering event occurred.

If, on the other hand, the test condition 506 is not satisfied, the flow chart follows the logical arrow 514 and closes the logical loop. This logical loop indicates that the step 504 is continuously performed until the test condition 506 is satisfied.

In one tamper-proof embodiment of the present invention, as indicated in the flow chart 600 of FIG. 6, a set of coordinates that defines the RAS is received from a secure pseudolite by using a tamper-proof receiver located on board of an aircraft (step 614). The following steps (606–610) closely resemble the steps (406–410) of the method of the present invention as depicted in the flow chart 400 of FIG. 4, and therefore are incorporated herein by reference.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for navigating an aircraft comprising the steps of:
    (A) substantially continuously performing an authentication process to verify the identity of a pilot;
    (B) if authentication process fails, undertaking emergency action;
    (C) if authentication of the pilot's identity is confirmed, checking whether a valid overriding command is generated by an overriding processor;
    (D) if said valid overriding command is not generated, navigating said aircraft around a restricted air space (RAS) in a restricted air space mode (RAS-mode);
    (E) if said valid overriding command is generated, navigating said aircraft in an overriding mode (RAS-override-mode); and
    (F) repeating said steps (A–E).

2. The method of claim 1, wherein said step of performing said authentication process to verify the identity of said pilot further includes the steps of:
    verifying the authenticity of biometrical data selected form the group consisting of: a voice of said pilot, and a retinal or an iris scan of said pilot.

3. The method of claim 1, wherein said step of navigating said aircraft around said RAS in said RAS-mode further includes the steps of:
    substantially continuously obtaining a set of coordinates that defines said RAS;
    substantially continuously obtaining a set of real time position coordinates of said aircraft; and
    analyzing a set of real time data including said set of coordinates that determines said RAS, and said set of real time position coordinates of said aircraft in order to substantially continuously generate a real time set of commands.

4. The method of claim 3, wherein said step of analyzing said set of real time data including said set of coordinates that determines said RAS, and said set of real time position coordinates of said aircraft further includes the steps of:
    (A) substantially continuously generating a likelihood of penetration of said RAS;
    (B) estimating whether said likelihood of penetration of said RAS exceeds a first predetermined likelihood threshold;
    (C) if said likelihood of penetration of said RAS exceeds said first predetermined threshold, generating a set of real time commands for executing a set of evasive maneuvers to avoid said RAS; and
    (D) repeating said steps (A–C).

5. The method of claim 4, wherein said step (C) of generating said set of real time commands for executing said set of evasive maneuvers to avoid said RAS further includes the steps of:

(C1) calculating a penetration vector using a flight path of said aircraft;

(C2) estimating a likelihood of interception a surface of said RAS by said penetration vector;

(C3) if said likelihood of penetration of said surface of said RAS by said penetration vector exceeds a second predetermined threshold, generating an emergency warning command and calculating a set of evasive parameters; and (C4) repeating said steps (C1–C3).

6. The method of claim 5, wherein said step (C3) further includes the step of:

presenting said warning commands audibly and/or visually to said pilot;

determining the amount of time necessary to take evasive maneuvers in order to avoid penetration of said RAS; and calculating the amount of time remaining before said set of evasive maneuvers is executed.

7. The method of claim 3, wherein said step of substantially continuously obtaining said set of coordinates that defines said RAS further includes the step of:

downloading said set of coordinates that defines said RAS further from a tamper-resistant RAS (TAP-RAS) database located on board of said aircraft.

8. The method of claim 7, wherein said wherein said TAP-RAS database further includes a set of reference points, and wherein said aircraft includes at least one reference point, said step of downloading said set of coordinates that defines said RAS further from said tamper-resistant RAS (TAP-RAS) database located on board of said aircraft further includes the step of:

substantially continuously measuring a set of real time distance vectors by using a sensor located on board of said aircraft; wherein each said real-time distance vector includes a real-time distance vector between at least one said reference point in said TAP-RAS database and said at least one reference point of said aircraft.

9. The method of claim 8, wherein said step of substantially continuously measuring said set of real time distance vectors by using said sensor located on board of said aircraft further includes the step of:

using a laser sensor.

10. The method of claim 1, wherein said step of navigating said aircraft around said RAS in said RAS-mode further includes the step of:

navigating said aircraft around said RAS in said RAS-mode using a tamper-resistant on-board apparatus.

11. The method of claim 10, further including the steps of:

continuously monitoring whether said tamper-resistant on-board apparatus was tampered with; and if said tamper-resistant apparatus on-board was tampered with, sending a set of monitoring data to a ground controller using an aircraft-ground link;

wherein said set of monitoring data is selected from the group consisting of:

a flight information, an aircraft ID number, a time coordinate when said tampering event occurred, a set of position coordinates of said aircraft at said time coordinate when said tampering event occurred, and a speed vector of said aircraft at said time coordinate when said tampering event occurred.

12. The method of claim 3, wherein said step of substantially continuously obtaining said set of coordinates that defines said RAS further includes the step of:

receiving a set of coordinates that defines said RAS from a secure pseudolite.

13. The method of claim 12, wherein said step of receiving said set of coordinates that defines said RAS further includes the step of:

receiving said set of coordinates that defines said RAS from at least one anti-spoof and anti-jam split-spectrum pseudolite; said one anti-spoof and anti-jam split-spectrum pseudolite located in said RAS and configured to substantially continuously transmit a set of real time split-spectrum pseudolite signals including the position coordinates of said pseudolite and a buffer range around said RAS; and wherein said set of split-spectrum signals is configured to minimize interference with the reception of satellite signals.

14. The method of claim 1, wherein said step of navigating said aircraft in said overriding mode (RAS-override-mode) further includes the step of:

generating said valid overriding command by using said overriding processor.

\* \* \* \* \*